(12) United States Patent
Mohammed et al.

(10) Patent No.: US 9,355,157 B2
(45) Date of Patent: May 31, 2016

(54) INFORMATION TARGETING SYSTEMS AND METHODS

(71) Applicant: Intertrust Technologies Corporation, Sunnyvale, CA (US)

(72) Inventors: Irfan Mohammed, Fremont, CA (US); Dennis Su, Sunnyvale, CA (US); David Maher, Livermore, CA (US); Yiming Ma, Fremont, CA (US); Rudi Cilibrasi, Sunnyvale, CA (US); Julien Bellanger, Los Angeles, CA (US)

(73) Assignee: Intertrust Technologies Corporation, Sunnyvale, CA (US)

( * ) Notice: Subject to any disclaimer, the term of this patent is extended or adjusted under 35 U.S.C. 154(b) by 158 days.

(21) Appl. No.: 13/946,750

(22) Filed: Jul. 19, 2013

(65) Prior Publication Data

US 2014/0025660 A1 Jan. 23, 2014

Related U.S. Application Data

(60) Provisional application No. 61/674,249, filed on Jul. 20, 2012, provisional application No. 61/675,261, filed on Jul. 24, 2012, provisional application No. 61/731,633, filed on Nov. 30, 2012, provisional application No. 61/751,143, filed on Jan. 10, 2013.

(51) Int. Cl.
*G06F 17/30* (2006.01)
*G06Q 30/02* (2012.01)
*G06Q 50/26* (2012.01)

(52) U.S. Cl.
CPC .... *G06F 17/30554* (2013.01); *G06F 17/30867* (2013.01); *G06Q 30/0251* (2013.01); *G06Q 50/265* (2013.01)

(58) Field of Classification Search
CPC ..... G06F 17/3053; G06F 17/30; G06F 15/16; G06F 17/30386; G06F 17/30598; G06F 17/30867; G06F 17/30876; G06F 17/30554; G06F 17/30241; G06F 17/30312; H04L 67/22; H04L 43/16; H04L 67/10; H04L 51/32; H04L 41/04; H04N 21/23; G06Q 50/01; G06Q 10/107; G06Q 10/00; G06Q 50/265; G06Q 30/0251; H04W 4/028; H04W 4/025
USPC ......... 707/732, 737, 711, 741, 749, 758, 724, 707/722, 728, 759, 769, 755, 748, 803, 707/E17.051, E17.009, E17.014, E17.108, 707/E17.069, E17.019, E17.089, E17.044, 707/E17.033, E17.134; 705/7.12, 7.29, 10, 705/1.1, 14.53, 14.49, 14.66, 319, 342, 705/500; 709/203, 204, 205, 223, 224, 233; 348/155, 161, 143; 382/190, 165, 125, 382/118, 117, 115, 106, 103, 107, 236; 455/410, 414.1, 456.3, 456.2, 466

See application file for complete search history.

(56) References Cited

U.S. PATENT DOCUMENTS 8,234,387 B2 7/2012 Bradley et al.
2001/0051559 A1* 12/2001 Cohen et al. ............. 482/8
(Continued)

FOREIGN PATENT DOCUMENTS

EP 2169854 A1 3/2010
EP 2400408 A1 12/2011
(Continued)

OTHER PUBLICATIONS

Liang Dong—Clemson University, ldong@g.clemson.edu—"Hybrid Query Expansion on Ontology Graph in Biomedical Information Retrieval"—May 2012 pp. 1-140.*

(Continued)

*Primary Examiner* — Anh Ly
(74) *Attorney, Agent, or Firm* — Finnegan, Henderson, Farabow, Garrett & Dunner, LLP

(57) ABSTRACT

The present disclosure relates generally to systems and methods for the secure management of electronic information relating to a user. In certain embodiments, systems and methods disclosed herein may allow for personal information related to a user to be used in connection with information targeting systems and methods configured to match and/or target information for delivery to a user based on the user's interests. In some embodiments, personal information relating to a user may be stored and/or managed in a personal ontology graph or other data structure including, among other things, various inferred interests of the user derived from available personal information.

9 Claims, 13 Drawing Sheets

(56) References Cited

U.S. PATENT DOCUMENTS

| | | | |
|---|---|---|---|
| 2002/0173971 A1* | 11/2002 | Stirpe | G06F 17/30867 705/14.53 |
| 2007/0180519 A1 | 8/2007 | Boccon-Gibod | |
| 2007/0233857 A1* | 10/2007 | Cheng et al. | 709/224 |
| 2008/0015878 A1* | 1/2008 | Feng et al. | 705/1 |
| 2008/0268876 A1* | 10/2008 | Gelfand et al. | 455/457 |
| 2009/0160658 A1* | 6/2009 | Armstrong | G06F 17/241 709/203 |
| 2009/0187593 A1 | 7/2009 | Chen et al. | |
| 2009/0292692 A1* | 11/2009 | Kaihotsu | G06F 17/30657 707/E17.015 |
| 2009/0298480 A1* | 12/2009 | Khambete et al. | 455/414.1 |
| 2010/0036737 A1* | 2/2010 | Shenfield et al. | 705/14.59 |
| 2010/0223249 A1* | 9/2010 | Steelberg | G06F 17/30864 707/706 |
| 2010/0293049 A1* | 11/2010 | Maher et al. | 705/14.46 |
| 2010/0293050 A1* | 11/2010 | Maher et al. | 705/14.46 |
| 2010/0293057 A1* | 11/2010 | Haveliwala et al. | 705/14.66 |
| 2010/0293058 A1* | 11/2010 | Maher et al. | 705/14.66 |
| 2010/0299522 A1 | 11/2010 | Khambete | |
| 2011/0070863 A1* | 3/2011 | Ma et al. | 455/410 |
| 2011/0184807 A1 | 7/2011 | Wang et al. | |
| 2011/0231296 A1* | 9/2011 | Gross | G06Q 10/10 705/37 |
| 2011/0282898 A1* | 11/2011 | Schiffmann | G06F 17/30961 707/769 |
| 2012/0102050 A1* | 4/2012 | Button et al. | 707/749 |
| 2012/0166452 A1 | 6/2012 | Tseng | |
| 2012/0303452 A1* | 11/2012 | Xue et al. | 705/14.49 |
| 2013/0018954 A1* | 1/2013 | Cheng | 709/204 |
| 2013/0066876 A1* | 3/2013 | Raskino et al. | 707/741 |
| 2013/0159103 A1* | 6/2013 | Foroughi et al. | 705/14.53 |
| 2013/0262371 A1* | 10/2013 | Nolan | G06F 17/3061 707/E17.099 |
| 2013/0332987 A1 | 12/2013 | Tenneti et al. | |
| 2014/0024392 A1 | 1/2014 | Su et al. | |
| 2014/0128105 A1 | 5/2014 | Su et al. | |
| 2014/0156733 A1* | 6/2014 | Goranson | H04L 67/42 709/203 |
| 2015/0081443 A1* | 3/2015 | Davis | G06Q 30/0251 705/14.58 |

FOREIGN PATENT DOCUMENTS

| | | |
|---|---|---|
| KR | 10-2010-0113199 | 10/2010 |
| KR | 10-1007336 | 1/2011 |
| KR | 2011-0125484 A | 11/2011 |
| WO | WO2007/130150 | 11/2007 |

OTHER PUBLICATIONS

Ilaria Lombardi • Luca Console • Pietro Pavese—"Flexible rule-based inference exploiting taxonomies"—Article: ournal of Intelligent Information Systems—Feb. 2011, vol. 36, Issue 1,—pp. 27-48.*
International Search Report and Internartional Written Opinion mailed Nov. 8, 2013 for application No. PCT/2013/051377.
Extended European Search Report mailed Jun. 26, 2015 for Application No. 13820094.4.
Naudet, et al.; "An Ontoogy-Based Profiling and Recommending System for Mobile TV"; IEEE Third International Workshop on Semantic Media Adaptation and Personalization; Piscataway, NJ; Dec. 15, 2008; pp. 94-99.
Woerndl et al.; "Individual and Social Recommendations for Mobile Semantic Personal Information Management"; International Journal on Advances in Internet Technology; vol. 2, No. 2&3; Dec. 1, 2009; pp. 215-226.

* cited by examiner

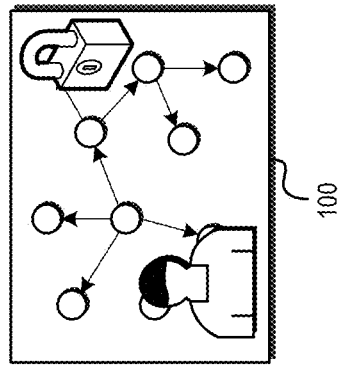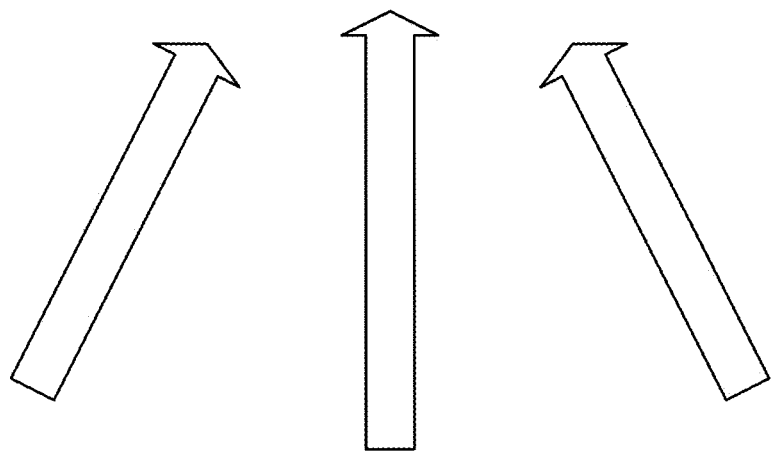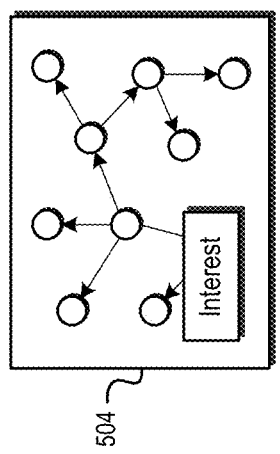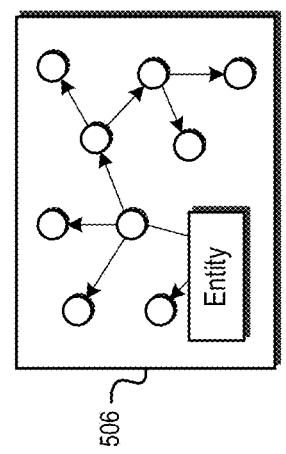
Figure 5

INFORMATION TARGETING SYSTEMS AND METHODS

RELATED APPLICATIONS

This application claims the benefit of priority under 35 U.S.C. §119(e) to U.S. Provisional Patent Application No. 61/674,249, filed Jul. 20, 2012, and entitled "INFORMATION TARGETING SYSTEMS AND METHODS", to U.S. Provisional Patent Application No. 61/675,261, filed Jul. 24, 2012, and entitled "INFORMATION TARGETING SYSTEMS AND METHODS", to U.S. Provisional Patent Application No. 61/731,633, filed Nov. 30, 2012, and entitled "INFORMATION TARGETING SYSTEMS AND METHODS", and to U.S. Provisional Patent Application No. 61/751,143, filed Jan. 10, 2013, and entitled "INFORMATION TARGETING SYSTEMS AND METHODS", all of which are hereby incorporated by reference in their entireties.

COPYRIGHT AUTHORIZATION

Portions of the disclosure of this patent document may contain material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

BACKGROUND AND SUMMARY

As the use of the Internet is increasingly intrinsic to people's daily activities, more personal electronic devices are interconnected. Such devices include, for example, phones, tablets, personal computers, cameras, e-book readers, TVs, gaming devices, automobiles, and even home appliances (e.g., thermostats, refrigerators, bathroom scales, etc.). Personal electronic devices often include a variety of sensors that may provide information regarding device location, motion, and/or other activities.

While connected devices offer many benefits, personal information collected by such devices and/or their constituent sensors may introduce certain privacy concerns. For example, access to and/or distribution of personal information related to a user by unauthorized parties may be damaging to the user. Accordingly, a user may wish to have a certain amount of control over the collection, use, management, and/or distribution of their personal information.

Systems and methods disclosed herein can facilitate secure collection, use, management, and/or distribution of personal information relating to a user. In some embodiments, personal information relating to a user may be included in a personal ontology graph or other data structure. The personal ontology graph may include, without limitation, information volunteered by a user (e.g., declared interests), information collected by monitoring a user's activities in connection with an associated device, and/or various inferred information (e.g., inferred interests) relating to the user. In certain embodiments, the personal ontology graph may be maintained on a user's device. In further embodiments, the personal ontology graph may alternatively, or in additions, be maintained by a trusted service. The privacy of information included in the personal ontology graph may be maintained in a variety of ways including, for example, using a personal agent operating locally on the user's device and/or on a trusted remote service.

In further embodiments, systems and methods disclosed herein may facilitate efficient targeting of information (e.g., advertisements, coupons, offers, content of interest, etc.) to a user based at least in part on personal information related to the user. Such personal information may be used to ensure information is delivered to a user that is well matched to the user's interests. For example, personal information provided by a user and/or generated based on a user's activities may be utilized to effectively match advertisements to the interests of the user. In certain embodiments, such personal information may be included in a personal ontology graph maintained, for example, by a personal agent and/or other trusted service. Utilizing personal information included in the personal ontology graph may allow the device, a content provider or distributor, and/or a trusted third party to target advertisements to the user matched to the users interests reflected in the associated personal ontology graph.

BRIEF DESCRIPTION OF THE DRAWINGS

The inventive body of work will be readily understood by referring to the following detailed description in conjunction with the accompanying drawings, in which:

FIG. 5 illustrates exemplary information used to generate a personal ontology graph consistent with embodiments of the present disclosure.

DETAILED DESCRIPTION

Figure 1:
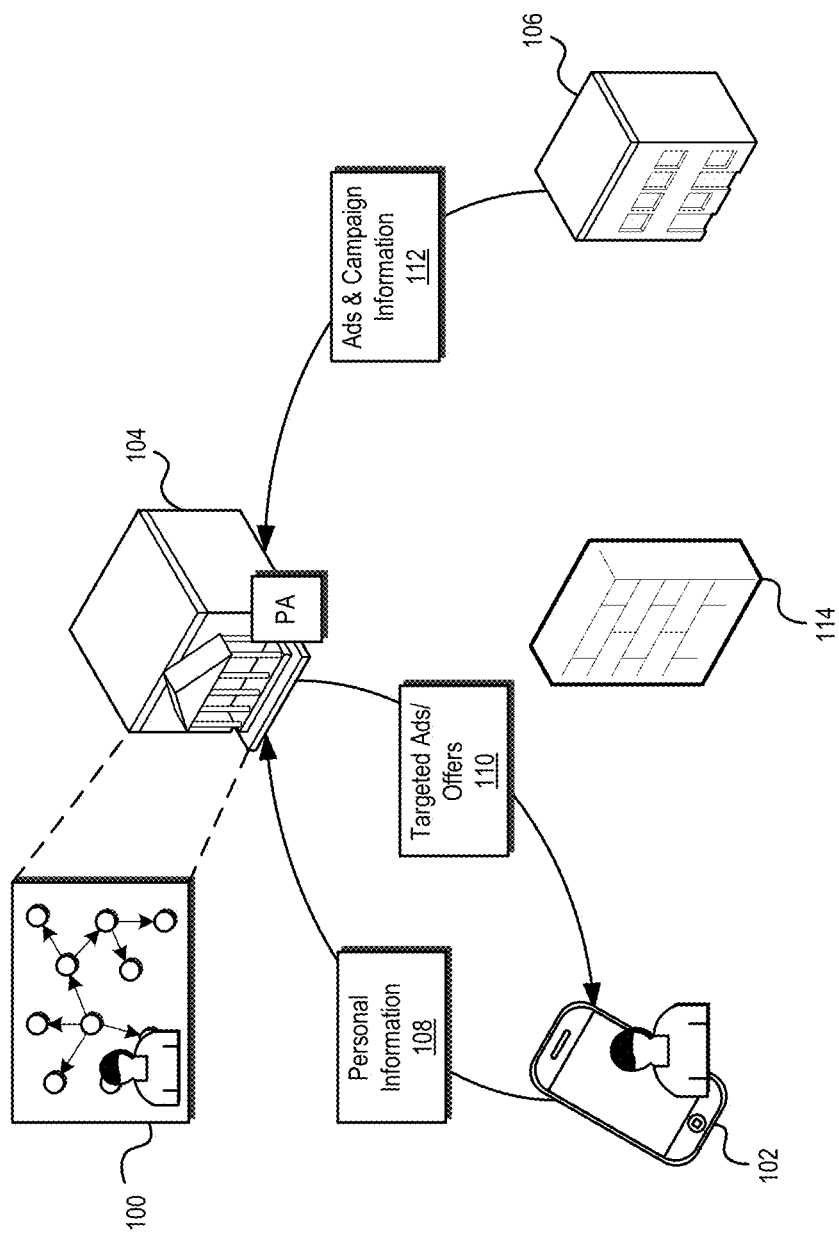
FIG. 1 illustrates an exemplary architecture for distributing advertisements and electronic content consistent with embodiments of the present disclosure.

A detailed description of systems and methods consistent with embodiments of the inventive body of work is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure may be understood by reference to the drawings, wherein like parts may be designated by like numerals. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of any method disclosed herein do not necessarily need to be executed in any specific order, or even sequentially, nor need the steps be executed only once, unless otherwise specified.

In the physical world, society has developed a variety of protective structures for the preservation of privacy. Certain protective structures implemented in the physical world, however, may not necessarily be present when privacy is considered in connection with electronic information. Systems and methods disclosed herein provide effective protective structures for personal information allowing users to maintain their privacy while simultaneously taking advantage of advances that new connected technologies offer.

As users interact with the Internet and other connected services, it may be helpful to personalize the information that is presented to a user so that unwanted clutter is filtered out. It is further desirable to have information presented in context, at the right time, in the right place, and in a manner that intelligently anticipates a user's needs. Utilizing personal information to present information that is useful to a user at the right time and/or location may be achieved when accurate, timely, and/or intimate personal information related to a user is available, and when a user can control how, where, when, and by whom such personal information is collected and/or used. Many users, however, do not have direct control over such data collection. For example, a user may not readily know what organizations are collecting personal information as the user interacts with devices, applications, and/or services, and/or how such information is collected, packaged, archived, reproduced, and/or distributed.

Certain embodiments disclosed herein allow for users to extract value from their personal information without needing to share such information with untrusted and/or unknown organizations and/or services. For example, in some embodiments, value may be extracted from user's personal information without users needing to reveal personal information directly to retailers, content providers, and/or other service providers, allowing such entities to provide users with timely, relevant, and/or personalized information regarding their products and/or services without compromising user privacy. In further embodiments, a system is disclosed allowing for personal recommendations, merchandising, and/or targeted advertising while maintaining a user's privacy, security, and/or control of his or her personal information.

In some embodiments, personal information may be managed in a personal ontology graph or other data structure that includes, without limitation, information volunteered by a user (e.g., declared interests), information collected by monitoring a user's activities in connection with an associated device (e.g., device activity information), and/or various inferred information (e.g., inferred interests) relating to the user. The systems and methods described herein can, for example, be used in connection with information (e.g., advertisement) matching and/or targeting technologies such as those described in commonly assigned co-pending U.S. patent application Ser. No. 12/785,406, "Content Delivery Systems and Methods," filed May 21, 2010, and published as U.S. Pub. No. 2010/0293049 A1 ("the '406 application"), and/or U.S. patent application Ser. No. 13/914,538, "Data Collection and Analysis Systems and Methods," file Jun. 10, 2013 ("the '538 application"), each of which is hereby incorporated herein by reference in its entirety.

To efficiently target advertisements to a particular user, a platform may obtain information regarding the user. In some circumstances, this may create a conflict between users and an advertisement service provider as a user may not wish to reveal much private information, whereas the service provider will typically want to collect as much information as possible. Embodiments of the systems and methods described in the '406 application may help to resolve such conflict by maintaining a user's information locally on an electronic device and/or in remote storage protected by a user's personal agent, while simultaneously making such information available for an information matching engine running locally on the user's device and/or remotely on a secure system. As a result, such a platform may protect a user's private information even while this information is used to target advertisements or other information to a user.

In further embodiments, the systems and methods described herein can, for example, be used in connection with digital rights management ("DRM") technologies such as those described in commonly assigned, co-pending U.S. patent application Ser. No. 11/583,693, filed Oct. 18, 2006 ("the '693 application"), DRM and service orchestration technologies described in commonly assigned, co-pending U.S. patent application Ser. No. 10/863,551, filed Jun. 7, 2004 ("the '551 application"), peer-to-peer ("P2P") content sharing technologies such as those described in commonly assigned U.S. patent application Ser. No. 12/784,290, filed May 20, 2010 ("the '290 application"), and/or the advertisement targeting technologies described in U.S. patent application Ser. No. 12/433,881, filed Apr. 30, 2009 ("the '881 application"), (the contents of the '693 application, the '551 application, the '290 application, and the '881 application hereby being incorporated by reference in their entireties), as well as in other contexts. It will be appreciated that these systems and methods are novel, as are many of the components, systems, and methods employed therein.

Personal information may be obtained related to a user as the user interacts with devices and services. For example, demographic information about the user (e.g., age, gender, etc.), usage history and preferences of the user, information about the user's device, content preference information (e.g., preferred genres, artists, etc.), information about the user or the user's environment (e.g., time of day, global positioning system ("GPS") coordinates, etc.), and/or any other available information relating to a user and/or an associated device may be obtained. In some circumstances, this personal information may be volunteered directly by a user. For example, in registering a device, a user may voluntarily provide personal demographic information to a device manufacturer and/or service provider. Personal information related to a user may also be obtained by monitoring the user's use of devices and/or services.

As discussed above, personal information provided by a user and/or generated based on a user's activities may, among other things, be utilized to effectively match ads or other content to the interests of the user. This may be achieved utilizing, for example, the information-matching technologies described in the '406 application. In certain embodiments, matching may be performed locally on a user's device. Alternatively, matching may be performed by a trusted third party. Further, in circumstances where a user utilizes multiple devices and/or services to consume content, personal information may be managed, shared, and/or aggregated between the devices and/or services to generate a more detailed and accurate profile of the user's interests. By improving the ability to generate a more detailed profile of a user's interests, managing personal information related to the user between multiple devices can improve information-matching services.

In the context of managing, sharing, and aggregating personal information between multiple devices and/or services, the confidentiality of certain private personal information related to the users should be maintained. In some circumstances, maintaining confidentiality of personal information may be mandated by local laws, privacy regulations, and/or by user preference. Accordingly, systems and methods may be deployed that allow for managing the confidentiality of user personal information. In some embodiments, this may be achieved by ensuring that certain personal information is not communicated outside of a user's device, devices, or a trusted boundary associated with the user. Additionally, anonymous versions of personal information may be generated that can be managed, shared, and aggregated between multiple devices and/or services without compromising user privacy. Further, users may specifically restrict access to certain categories and/or types of personal information, while allowing the sharing and aggregating of other types of personal information through one or more policies. Employing such techniques may allow for improved content-matching services while maintaining the confidentiality of certain user personal information.

In some embodiments, client software on a user's device may track a user's local usage behavior and save raw data related to such local usage. In some embodiments, such raw data can be protected locally, aggregated periodically to update a user profile, and/or aggregated across different devices associated with the consumer to update a user profile. The updated user profile may be used locally and/or remotely for purposes of advertisement targeting and/or for purposes of transmission to the user of virtually any other type of content or information (e.g., coupons, offers, rights to content, tickets, entertainment content, etc.). In certain embodiments, the user profile may be utilized in an anonymous or protected form.

Some users may have reservations about technology that records their behavior and reports it to third-party organizations. For example, a user may be concerned that their preferences and/or content consumption behavior will be used against them in some way (e.g., they may be discriminated against based on their cultural preferences, political preferences, etc.) and/or that it might cause embarrassment if it became publically known or distributed to certain parties (e.g., employers, family members, etc.).

Embodiments of the systems and methods described herein can be used to address these concerns in a number of ways including, for example, by providing users with an opportunity to opt-in and/or opt-out of data collection services, and/or limiting the transmission of collected data to trusted services (e.g., locally and/or in the cloud). For example, in some embodiments, personally identifiable information ("PII") that is collected may not be permitted to be transmitted from a device. Rather, profile information that may lack specific enough information to personally identify a particular user (e.g., lacking certain identification information) may be shared with a remote device or service. In some embodiments, users may be shown information that may be transmitted from their electronic device before it is transmitted.

Personal Ontology Graph Overview

To effectively target advertisements to a user, systems and methods disclosed herein may utilize, at least in part, personal information to create a realistic behavior model of a user. In certain embodiments, such a behavior model may be utilized to predict user buying decisions. Utilizing information provided by sensors included in a mobile device associated with a user (e.g., location-based sensors providing latitude and longitude information), point of interest databases (e.g., Google places and/or the like), and/or other mechanisms for gathering personal and inferred information relating to the user, the behavior model may be improved and/or refined over time.

Consistent with embodiments disclosed herein, personal information relating to a user may be included in a personal ontology graph or other data structure. A user's interests and/or behavior may be modeled based, at least in part, on information included in the personal ontology graph. In certain embodiments, the personal ontology graph may provide a map of a user's demographics and interests, allowing advertisers and/or other service providers to provide a more personalized experience for users. The personal ontology graph may, for example, include some or all of: information volunteered by a user (e.g., declared interests), information collected by monitoring a user's activities in connection with an associated device, and/or various inferred information (e.g., inferred interests) relating to the user. In certain embodiments, the personal ontology graph may be maintained on a user's device. In further embodiments, the personal ontology graph may be maintained by a trusted service. Privacy of information included in the personal ontology graph may be achieved in a variety of ways including, for example, using a personal agent operating locally on the user's device and/or on a trusted remote service.

In some embodiments, the personal ontology graph may comprise a plurality of layered ontology graphs. In some embodiments, the personal ontology graph may utilize a framework incorporating a user model, user interest, and a user-related-entity graph. The user model may comprise information regarding the identity of the user based on demographic, psychographic, behavioral, and/or geographic terms. User interests may include information regarding one or more concepts of interest to a user such as, for example, tastes, hobbies, occupation, and/or recreational activities. A user-related-entity-graph may include structured data and/or information in the form of ontologies about the user.

The personal ontology graph may include a plurality of interconnected nodes and edges. A user may be a primary object of interest represented in the personal ontology graph. Information about the user may be contextualized in a variety of other types of interconnected nodes and edges. Information included in the personal ontology graph may be represented in terms of nodes (e.g., people, entity, and/or concept nodes) connected by edges to other nodes with one or more attributes (e.g., times, scores, weights, etc.) attached to any node or edge. For example, the personal ontology graph may comprise one or more interest nodes, such as food taste preferences, associated products and/or services, visits to one or more places and/or locations, and/or one or more friends or other social connections. Examples of the generation and structure of a personal ontology graph consistent with embodiments disclosed herein are described in more detail below in reference to FIGS. 2-6.

Content and Advertisement Distribution Architecture

FIG. 1 illustrates an exemplary architecture for distributing advertisements and/or other electronic content consistent with embodiments of the present disclosure. As illustrated, the architecture may include a trusted service 104 communicatively coupled with a user device 102 and/or an information (e.g., advertisement) service provider 106. The trusted service 104 may provide a variety of functions including, without limitation, functions associated with an advertisement targeting platform such as that described in the '406 application and/or functions associated with the secure collection, use, management, and/or distribution of personal information relating to a user. In some embodiments, the trusted service 104 may provide certain functions associated with the generation and management of a personal ontology graph 100 associated with a user of user device 102.

The trusted service 104, user device 102 and/or service provider 106 may be communicatively coupled using a variety of networks and/or network connections. In certain embodiments, the network may comprise a variety of network communication devices and/or channels and may utilize any suitable communications protocols and/or standards facilitating communication between the user device 102, the trusted service 104, and/or the service provider 106. For example, the network may comprise the Internet, a local area network, a virtual private network, a cellular communications network, and/or any other communication network utilizing one or more electronic communication technologies and/or standards (e.g., Ethernet or the like). In some embodiments, the network may comprise a wireless carrier system such as a personal communications system ("PCS"), and/or any other suitable communication system incorporating any suitable communication technologies, standards, and/or protocols. In further embodiments, the network may comprise an analog mobile communications network and/or a digital mobile communications network utilizing, for example, code division multiple access ("CDMA"), Global System for Mobile Communications or Groupe Special Mobile ("GSM"), frequency division multiple access ("FDMA"), and/or time divisional multiple access ("TDMA") technologies. In certain embodiments, the network may incorporate one or more satellite communication links. In yet further embodiments, the network may utilize IEEE's 802.11 standards, Bluetooth®, ultra-wide band ("UWB"), Zigbee®, and or any other suitable technology or technologies.

The user device 102, the trusted service 104, and/or the service provider 106 may comprise a variety of computing devices and/or systems, including any computing system or systems suitable to implement the systems and methods disclosed herein. The connected systems 102-106 may comprise a variety of computing devices and systems, including laptop computer systems, desktop computer systems, sever computer systems, distributed computer systems, smartphones, tablet computers, gaming devices, electronic book readers, and/or the like.

In certain embodiments, the user device 102, the trusted service 104, and/or the service provider 106 may comprise at least one processor system configured to execute instructions stored on an associated non-transitory computer-readable storage medium. As discussed in more detail below, the user device 102, the trusted service 104, and/or the service provider 106 may further comprise a secure processing unit ("SPU") configured to perform sensitive operations such as trusted credential and/or key management, secure policy management, and/or other aspects of the systems and methods disclosed herein. The user device 102, the trusted service 104, and/or the service provider 106 may further comprise software and/or hardware configured to enable electronic communication of information between the devices and/or systems 102-106 via a network using any suitable communication technology and/or standard.

As the user interacts with the user device 102 (e.g., consumes content and/or interacts with applications and/or services), the user device 102 may obtain personal information 108 relating to the user. In certain embodiments, this personal information 108 may reflect in part the interests of the user. Personal information 108 may include, among other things, information volunteered by a user (e.g., declared interests) and/or information collected by monitoring a user's activities in connection with an associated device 102 (e.g., device activity information). For example, a user may provide a device 102 with personal identification information (e.g., age, gender, home address, and the like) and/or other preference information (e.g., content preference information including preferred genres, artists, and the like). Similarly, a device 102 may passively collect usage information regarding the types of content a user consumes, the number of times certain content is consumed, application usage information, location-based information relating to a location of the user, and/or the like. Collectively, personal information 108 may include, without limitation, user attributes such as gender, age, content preferences, geographic location, attributes and information associated with a user's friends, contacts, and groups included in a user's social network, and/or information related to content and/or application usage patterns including what content is consumed, content recommendations, advertisement viewing patterns, and/or the like.

Certain personal information 108 may be volunteered (e.g., provided directly) by a user. For example, in registering or configuring device 102, a user may voluntarily provide personal demographic information to the device 102, a device manufacturer, and/or a service provider. In certain embodiments, this information may include a user's age, gender, contact information, address, field of employment, and/or the like. User-volunteered personal information may also include content preference information (e.g., preferred genres, preferred artists, etc.). In some embodiments, in lieu of or in addition to collecting personal information 108 as part of a device registration or configuration process, user-volunteered personal information may be provided by a user when registering with a service or at various times during a user's interaction with a device 102 (e.g., concurrent with selection of a particular piece of content or using a particular application).

In further embodiments, personal information 108 may comprise one or more certified attributes acquired from one or more trusted sources that can authenticate certain attributes relating to the user and/or the user device 102 (e.g., attributes relating to age, gender, education, club membership, employer, frequent flyer or frequent buyer status, credit rating, etc.). User device 102 may also generate and/or collect other attributes from various user events as personal information 108 including, for example, metrics or attributes derivable from a user's history of interactivity with ads, purchasing history, browsing history, content rendering history, application usage history, and/or the like. Further, a variety of environmental attributes may also be included in personal information 108 such as time of day, geographic location, speed of travel, and/or the like.

Personal information 108 may further include information collected by monitoring a user's activities in connection with an associated device 102 (e.g., device activity information and/or usage data). Usage data may include information regarding the types of content a user consumes, the number of times certain content is consumed, metrics or attributes derivable from a user's history of interactivity with ads and/or content, information regarding application usage, application usage history, purchasing history, browsing history, content rendering history, and/or the like. In certain embodiments, usage data may be generated locally on a user's device 102 through monitoring of a user's interaction with the device 102. Alternatively, or in addition, usage data may be generated by a trusted third party capable of monitoring a user's interaction with a device 102. In some embodiments, usage data may be stored locally on a user's device 102 in a secure manner to protect the integrity of the data and/or usage data may be filtered suitably to ensure that it is anonymized in some way before it is transmitted from the device 102.

Consistent with embodiments disclosed herein, personal information 108 may also include various inferred information (e.g., inferred interests) relating to a user of device 102. For example, personal information 108 may include information inferred from information volunteered by a user (e.g., declared interests) and/or information collected by monitoring a user's activities in connection with an associated device 102 (e.g., device activity information). For example, if a user volunteers that they have an interest in winter sports, it may be inferred that they have an interest in sports in general. Similarly, if a user regularly visits a gym (e.g., based on collected location information), it may be inferred that the user has an interest in fitness. As discussed in more detail below, in certain embodiments, such inferences may be made by an inference engine executing on the user device 102 and/or the trusted service 104. It will be appreciated that a variety of inferences may be drawn based on a wide variety of available personal information, and that any suitable method, algorithm, and/or architecture for drawing such inferences may be utilized in connection with the embodiments disclosed herein.

In some embodiments, the user device 102 may include a variety of sensor systems configured to provide information that may be utilized as personal information 108. For example, the user device 102 may include, without limitation, one or more accelerometers, GPS sensors, acoustic sensors, infra-red sensors, imaging sensors, gyroscopes, proximity sensors, light sensors, magnetometers, cameras, wireless communication systems, and/or any other suitable system and/or sensors for detecting and/or measuring information associated with the user device 102, its surroundings, and/or a user of the device 102. Certain sensors of user device 102 may be location-based sensors configured to generate personal information relating to a location of the user device 102 and/or an associated user. Further sensors may be activity-based and/or other environmental-sensors configured to provide information relating to usage of the user device 102 and/or an environment proximate to the device 102. In certain embodiments, the one or more sensors of the device 102 may measure contextual information that may be used to determine and/or infer certain personal information relating to the user (e.g., interests, regularly visited points of interest, etc.). For example, if an accelerometer of device 102 indicates that the device 102 does not move on average between 11:00 PM and 6:00 AM every day, it may be inferred that the user typically sleeps between these hours.

As illustrated, the user device 102 may transmit personal information 108 relating to the user of the device to a trusted service 104. The trusted service 104 may provide certain functions associated with a content targeting platform such as that described in the '406 application. In some embodiments, based on received personal information 108, the trusted service may generate and/or manage a personal ontology graph 100 associated with a user of user device 102. A user's interests and/or behavior may be modeled based, at least in part, on information included in the personal ontology graph 100. The personal ontology graph 100 may provide a map of a user's demographics and interests, allowing service providers (e.g., advertisement service provider 106) to provide a more personalized experience for users. The personal ontology graph 100 may include, without limitation, information volunteered by a user (e.g., declared interests), information collected by monitoring a user's activities in connection with an associated device, and/or various inferred information (e.g., inferred interests) relating to the user. Privacy of information included in the personal ontology graph 100 may be achieved in a variety of ways including, for example, using a personal agent operating locally on the user's device 102 and/or on the trusted service 104.

Consistent with embodiments disclosed herein, the trusted service 104 may operate in conjunction with the user device 102 and the service provider 106 to provide certain content targeting services. In certain embodiments, the trusted service 104 may function as a trusted intermediary between the user device 102 and the service provider 106. For example, as illustrated, the trusted service 104 may receive advertisements and campaign information 112 (e.g., information defining parameters of an advertising campaign) from the service provider 106. Based on information included in the personal ontology graph 100 and the received campaign information 112, the trusted service 104 may match advertisements to a user's interests and transmit matched advertisements to the user device 102 for rendering (e.g., rendering in connection with certain content and/or the like).

Privacy and/or confidentiality of user personal information 108 and/or personal ontology graph 100 may be maintained by the trusted service 104 without exposing such information to the service provider 106. By utilizing the trusted service 104 as a trusted intermediary, value may be extracted from user's personal information without users needing to reveal personal information directly to the service provider 106, allowing the service provider 106 to provide users with timely, relevant, and/or personalized information regarding products and/or services while maintaining a secure privacy boundary 114 between the user device 102 and the service provider 106.

It will be appreciated that a number of variations can be made to the architecture and relationships presented in connection with FIG. 1 within the scope of the inventive body of work. For example, without limitation, in some embodiments, some or all of the functions performed by the user device 102 may be performed by the trusted service 104. Similarly, some or all of the functions performed by the trusted service 104 may be performed by the user device 102. Moreover, although illustrated in FIG. 1 in the context of advertisement targeting, further embodiments may be utilized in connection with other information and/or content targeting operations, including content targeting operations that do not necessarily involve targeting and/or matching of advertisements to a user's interests (e.g., targeting by an entertainment content provider and/or the like).

Personal Ontology Graph Generation

Figure 2:
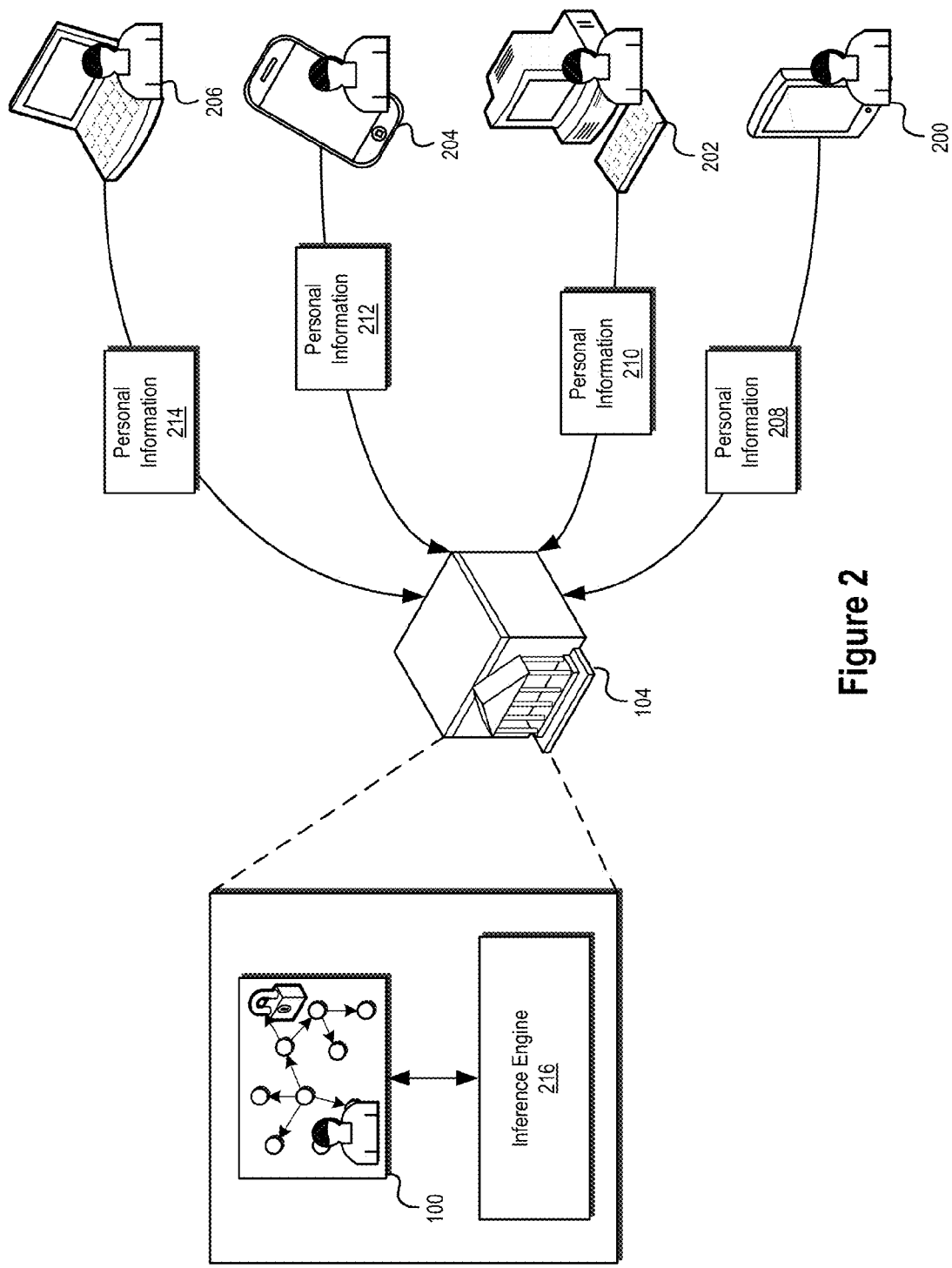
FIG. 2 illustrates generation of a personal ontology graph by a trusted service consistent with embodiments of the present disclosure.

FIG. 2 illustrates generation of a personal ontology graph 100 by a trusted service 104 consistent with embodiments of the present disclosure. Users often interact with multiple devices 200-206. For example, a user may utilize a smartphone 204 to interact with one or more mobile applications and a tablet computer 200 to perform online shopping activities. Through different interactions with a user and/or services, different devices 200-206 may obtain different personal information 208-214.

Increasing the amount of user personal information 208-214 that can be utilized for ad-matching and/or other information targeting services may increase the overall effectiveness of such services. Therefore, a trusted service 104 may communicate with a plurality of devices 200-206 associated with a user and receive personal information 208-214 related to a user from the plurality devices 200-206. Based on the personal information 208-214 provided by one or more devices 200-206, a personal ontology graph 100 associated with the user may be generated by the trusted service 104 (e.g., generated by a personal agent operating on the trusted service 104 and/or the like).

The personal ontology graph 100 may provide a behavior model of a user associated with devices 200-206. In certain embodiments, the behavior model reflected in the information contained in the personal ontology graph 100 may, among other things, be utilized to model user interests for use in advertisement and/or other information targeting methods, to predict user buying decisions and other behaviors, and/or the like. In certain embodiments, to protect a user's privacy, the personal ontology graph 100 may be encrypted and/or otherwise protected by trusted service 104 using any suitable secure encryption technique or techniques. In further embodiments, the personal ontology graph 100 may be improved and/or refined over time based on updated personal information 208-214 provided by the plurality of devices 200-206.

The personal ontology graph 100 may include, without limitation, information volunteered by a user (e.g., declared interests), information collected by monitoring a user's activities in connection with an associated device, and/or various inferred information (e.g., inferred interests) relating to the user. In certain embodiments, an inference engine 216 operating on the trusted service 104 may be configured to generate inferred information included in the personal ontology graph 100 based on received personal information 208-214. For example, the inference engine 216 may generate and include in the personal ontology graph 100, among other things, a variety of user inferred interests, characteristics, preferences, behavioral habits (e.g., schedules, travel patterns, etc.), and/or the like based on received personal information 208-214. In generating inferences, inference engine 216 may employ a variety of suitable techniques.

In some embodiments, the inference engine 216 may utilize contextual information included in personal information 208-214 to generate associated inferred information included in the personal ontology graph 100. For example, personal information 208-214 may include information relating to a user's location. If the location information indicates that a user is at a particular location regularly during certain late evening/early morning hours, inference engine 216 may determine (e.g., based on one or more inference rules) that the location is associated with a user's residence. In this manner, contextual information that may not directly provide useful behavioral information about a user (e.g., interests, preferences, schedules, etc.), may be utilized by the inference engine 216 to generate useful behavioral information about a user that may be utilized in information targeting and/or other services.

In some embodiments, the inference engine 216 may utilize one or more inference rules, databases, and/or knowledge-based ontologies or taxonomies that, in some instances, may be maintained by trusted service 104, to generate inferences included in personal ontology graph 100. In further embodiments, the inference engine 216 may utilize one or more inference rules, databases, and/or knowledge-based ontologies or taxonomies (e.g., external ontologies) maintained by one or more other services to generate inferred information. In some embodiments, such ontologies or taxonomies may comprise a set of concepts and/or one or more relationships between those concepts. Ontologies/taxonomies utilized by the inference engine 216 may have a shared vocabulary and/or data model, and may include the definitions of included entities and/or concepts and associated relationships. In certain embodiments, the inference engine 216 may utilize, for example, information included in various knowledge-based resources and/or ontologies such as Freebase, Wikipedia, DBPedia, and/or BabelNet to generate inferences reflected in the personal ontology graph 100 based on personal information 208-214 received from user devices 200-206. Inferences included in the personal ontology graph 100 generated by inference engine 216 may change and/or be updated with changes to associated inference rules, databases, knowledge-based ontologies or taxonomies, and/or received personal information 208-214, allowing the personal ontology graph 100 to be continuously updated, enriched, and/or improved over time to more accurately model a user's behavior, interests, and/or preferences.

Personal Ontology Graph Structure

Figure 3:
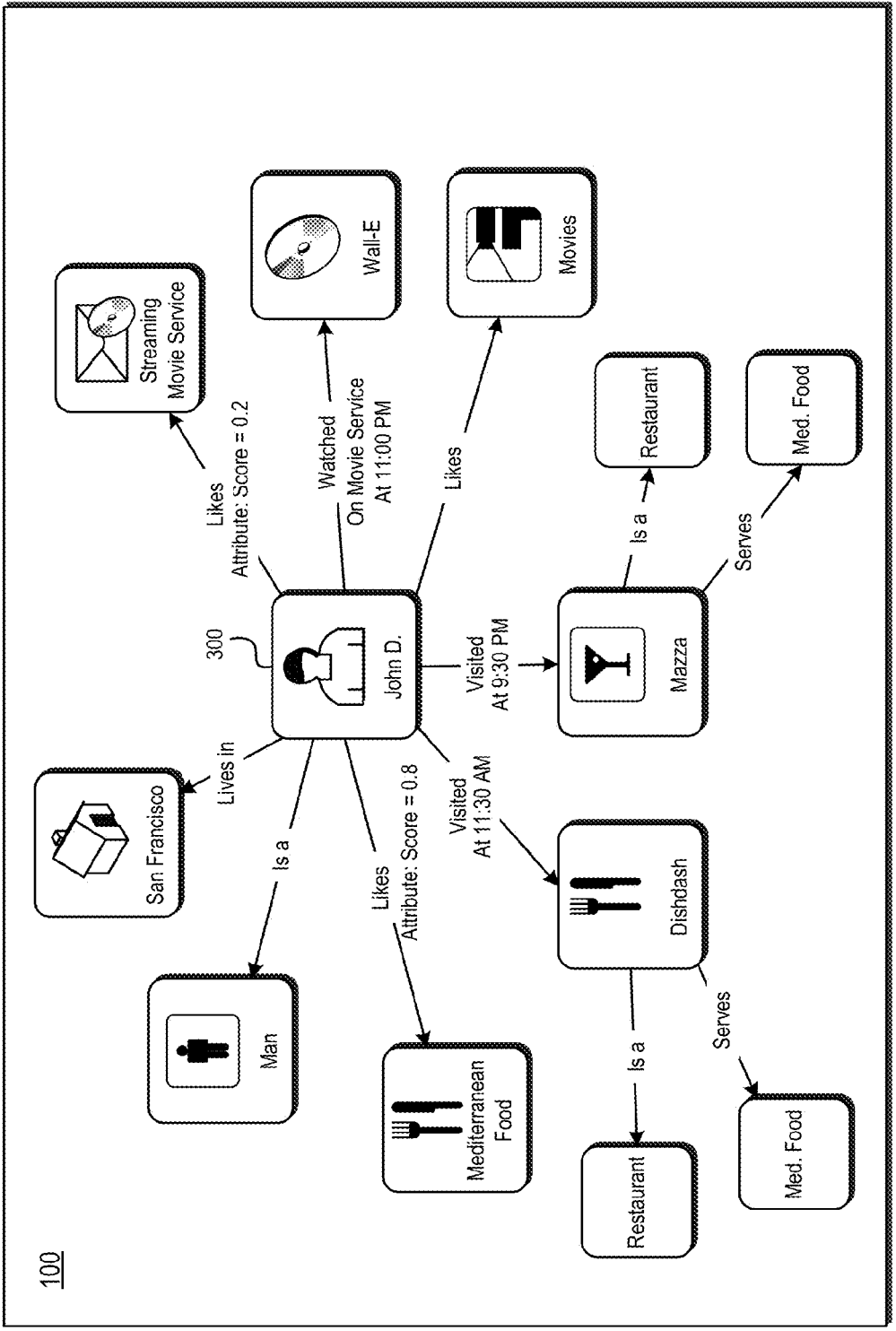
FIG. 3 illustrates an exemplary personal ontology graph consistent with embodiments of the present disclosure.

FIG. 3 illustrates an exemplary personal ontology graph 100 consistent with embodiments of the present disclosure. A particular user may be represented by a user node 300 as a central entity included in the personal ontology graph 100. As discussed above, the personal ontology graph 100 may function as a model for the user's behaviors, interests, and/or preferences.

In some embodiments, the personal ontology graph 100 may comprise a plurality of nodes connected by one or more edges that, in certain embodiments, may be directed edges. In one embodiment, nodes may comprise, without limitation, person nodes, entity nodes, and/or concept nodes. In other embodiments, other node types may be used instead or in addition. In one embodiment, person nodes may include, for example, nodes representing a user 300 and other persons associated with the user 300. For example, a user node 300 may be connected with one or more nodes associated with the user's friends, colleagues, family, and/or the like. In further embodiments, person nodes may include nodes representing celebrities, politicians, public figures, historical figures, and/or other individuals having some association with the user. In some embodiments, person nodes associated with a user may be derived from personal information relating to a user's social connections (e.g., contact lists associated with one or more device applications and/or the like). In further embodiments, a trusted service may interface with one or more social network services associated with the user to access personal information used to generate person nodes representing individuals the user is associated with.

In one embodiment, entity nodes may include, for example, nodes representing one or more entities, locations, organizations, businesses, places, things, and/or the like associated with the user. For example, an entity node may include a node associated with a location a user has visited (e.g., as determined by location information included in personal information used to generate personal ontology graph 100), an organization a user is a member of, a thing the user owns and/or regularly uses (e.g., a sports car, a service provider, etc.), and/or the like. In some embodiments, an entity node may represent a specific entity (e.g., a particular restaurant), while in other embodiments, an entity may represent a general entity (e.g., restaurants in general).

In one embodiment, concept nodes may include, for example, nodes representing one or more concepts, things, and/or ideas associated with a user. For example, a concept node may include a node associated with a generalized activity (e.g., sports), a node associated with an idea or field of interest (e.g., democracy, macro-economics, interior design, sustainable development, etc.), a node associated with a particular taste or other preference (e.g., sweet, salty, etc.), and/or any other suitable concept, thing, and/or idea that may be embodied as a node included in the personal ontology graph 100. In certain embodiments, concept nodes connected to a user node 300 may provide a generalized abstraction of a user's interests. It will be appreciated that a variety of other nodes and/or types of nodes may be included in a personal ontology graph 100, and that any suitable node may be utilized in connection with embodiments of the personal ontology graph 100 disclosed herein.

Edges included in the personal ontology graph 100 may define a relationship between two interconnected nodes. A variety of edges and/or edge types may be utilized. For example, edges may be associated with particular interests (e.g., likes, dislikes, etc.), behaviors and/or activities, (e.g., visits frequently, visits occasionally, travels by, watched, attended) demographic attributes (e.g., is a, lives in, etc.), and/or any other possible relationship between two interconnected nodes. In certain embodiments, edge types may be limited to one or more defined relationships. In further embodiments, new edge types and/or associated relationships may be generated over time.

In some embodiments, edge types may change as a personal ontology graph 100 is improved and/or refined over time. For example, edges may change based on activity, location, and/or context. As a user's preferences pertaining to a particular node may change over time, so may an associated edge. For example, if a user likes a particular restaurant, the personal ontology graph 100 may include an entity node associated with the restaurant connected to the user node 300 by an edge indicating that the user likes the restaurant. If, however, the user later grows to dislike the restaurant, the edge connecting the entity node associated with the restaurant to the user node 300 may change to reflect to user's changed taste. In this manner, the personal ontology graph 100 may reflect a user's interests and/or preferences at a particular period of time.

Referring to the exemplary personal ontology graph 100 illustrated in FIG. 3, the particular user may be identified, based on demographic information regarding the user included in available personal information, as a man who lives in San Francisco. Accordingly, the personal ontology graph 100 may include a node indicating the user is a man connected to the user node 300 by an edge defining this relationship (e.g., "is a"). Similarly, the user node 300 may be connected to a location node associated with San Francisco by an edge defining that the user resides there (e.g., "lives in").

The user may visit one or more restaurants. For example, the user may visit restaurants named "Dishdash" and "Mazza" (e.g., as indicated by location-based personal information indicating the user visited these locations). Accordingly, the personal ontology graph 100 may include nodes associated with these restaurants connected to the user node 300 by edges indicating the user's visits. In certain embodiments, an inference engine may interface with one or more directories, and/or knowledge-based ontologies or taxonomies and generate further nodes associated with the restaurant nodes. For example, based on information contained in a business directory or other database resource, an inference engine may generate nodes connected by an appropriate edge (e.g., "is a") with the "Dishdash" and "Mazza" nodes indicating the entities are restaurants. Similarly, an inference engine may utilize information included in a resource indicating that the restaurants serve Mediterranean food and generate concept nodes associated with Mediterranean food connected to the "Dishdash" and "Mazza" nodes by appropriate edges (e.g., "serves").

The user may watch a particular movie on a streaming moving service. Accordingly, the personal ontology graph 100 may include an entity node associated with the movie connected to the user node 300 by an appropriate edge (e.g., "watched on movie service" or the like).

Based on information included in the personal ontology graph 100, an inference engine may generate additional connected nodes/edges based on one or more applicable inferences. For example, based on the user watching a movie on the streaming movie service, the inference engine may generate a node associated with the movie streaming service connected to the user node 300 by an edge indicating the user likes the service. The inference engine may also infer, based on the user watching the movie, that the user likes movies in general, and may further generate a node associated with movies connected to the user node by an edge indicating the user likes movies. Similarly, based on the user visiting the restaurants "Dishdash" and "Mazza", the inference engine may infer that the user likes Mediterranean food and generate a connected node and edge reflecting the same.

In certain embodiments, edges may be associated with one or more attributes providing further information regarding an associated relationship between two or more nodes. For example, an attribute associated with an edge reflecting a particular activity (e.g., visited, watched, etc.) may include a time at which the activity took place. Attributes may further include scores and/or weights reflecting a strength of an association between nodes (e.g., a strength of inferred relationships).

Scores and/or weights may depend on a variety of factors including, for example, recency, frequency, and confidence in reliability of data source. For example, in the example illustrated in FIG. 3, an edge connecting the user node 300 with a node associated with Mediterranean food may have a relatively high score based on the user frequenting multiple Mediterranean restaurants (e.g., "Dishdash" and "Mazza") within a recent time frame. An edge connecting the user node 300 with an entity node for a streaming movie service may have a lower score based on the user viewing a single movie on the service. In certain embodiments, attributes (e.g., scores and/or weights) may be updated and/or changed over time. For example, in some embodiments, certain attributes (e.g., scores and/or weights) may decay over time. In this manner, attributes associated with edges may further be utilized to ensure the personal ontology graph 100 reflects a user's current interests and/or behaviors. Certain types of data used to generate inferences (e.g., user-volunteered information) may also be viewed as more reliable and, accordingly, the type of information used to derive an inference may also affect a score and/or weight of an association and/or inference.

It will be appreciated that a number of variations can be made to the architecture and relationships presented in connection with the exemplary personal ontology graph 100 illustrated in FIG. 3 within the scope of the inventive body of work. For example, a variety of other suitable types of nodes and/or edges may be utilized in connection with embodiments disclosed herein. Moreover, although described above in the context of a graphical ontology, further embodiments may utilize any suitable data structure reflecting personal information and inferred relationships derived therefrom. Thus it will be appreciated that FIG. 3 is provided for purposes of illustration and explanation, and not limitation.

Figure 4:
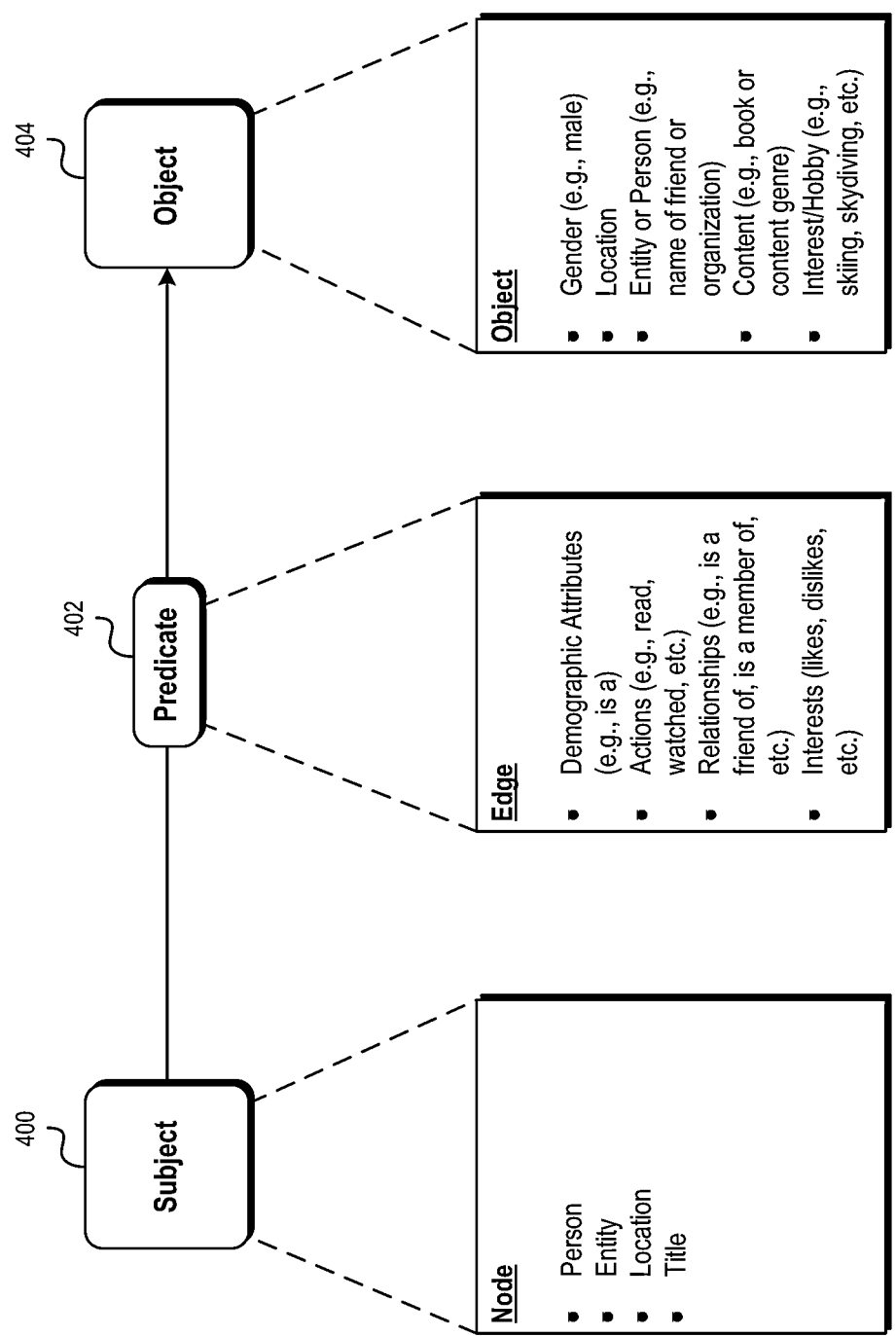
FIG. 4 illustrates exemplary elements of a personal ontology graph consistent with embodiments of the present disclosure.

FIG. 4 illustrates exemplary elements 400-404 of a personal ontology graph consistent with embodiments of the present disclosure. As discussed above, a personal ontology graph may include a plurality of interconnected nodes and/or edges. Conceptually, each interconnected relationship may include an associated subject 400, predicate 402, and object 404. In some embodiments, interconnected relationships between nodes may comprise one or more resource description framework ("RDF") triples.

A subject 400 may comprise any suitable type of node. For example, a subject 400 may include a person node, an entity node, a concept node, a location node, a title node, and/or any other type of node. The subject 400 may be connected to the object 404 by the predicate 402. In certain embodiments, the predicate 402 may comprise a type of edge (e.g., a directed edge) connecting two associated nodes. The predicate 402 may define a relationship between two nodes by any suitable term or terms. For example, the predicate 402 may define one or more demographic relationships (e.g., is a, lives in, etc.), one or more actions (e.g., read, watched, etc.), one or more relationships (e.g., is a friend of, is a member of, is an employee at, etc.), interests (e.g., likes, dislikes, etc.), and/or any other type of articulated relationship between two nodes. The object 404 may include any suitable type of node including, for example, a person node, an entity node, a concept node, a location node, a title node (e.g., a node associated with a gender, location, entity, person, content, interests/hobbies, etc.).

FIG. 5 illustrates exemplary information 502 used to generate a personal ontology graph or other data structure 100 consistent with embodiments of the present disclosure. As discussed above, a variety of types of personal information obtained by one or more user devices and/or information inferred therefrom may be utilized in generating a personal ontology graph 100. For example, as illustrated, user demographic information 502 may be used to generate a personal ontology graph 100 relating to a user. In some embodiments, the user demographic information may include user-volunteered personal information and/or any other type of personal information relating to an identity of the user (e.g., demographic, psychographic, behavioral, and/or geographic attributes). In certain embodiments the user demographic information 502 may generally answer the question: Who is the user?

A user interest graph 504 may further be used to generate a personal ontology graph 100. In certain embodiments, the interest graph 504 may generally answer the question: What does the user like? The interest graph 504 may include one or more interests declared by a user (e.g., as reflected in volunteered personal information). For example, in some embodiments, a trusted service may communicate with one or more social network service providers (e.g., Facebook, Twitter, etc.) and receive information relating to a user's interests that may be included in an associated interest graph 504. In certain embodiments, the information included in the personal ontology graph 100 may be extensible. That is, users may not only declare interests associated with a pre-defined set of interest nodes, but may also define their own customized nodes.

In further embodiments, the interest graph 504 may include information inferred based on available personal information relating to the user. In some embodiments, the interest graph 504 may include one or more interests inferred from user activity information included in available personal information relating to the user. For example, if an application browsing history indicates that the user searched for the term "Mustang GT", it may be inferred that the user is also interested in cars, car racing, Ford Motor Company, Henry Ford, and/or any other related concepts. A variety of other inferred interests may also be included in the interest graph 504.

An entity graph 506 may further be used to generate a personal ontology graph 100. The entity graph 506 may define one or more relationships between entities and/or concepts. For example, if a user interest graph 504 indicates a user has an interest in winter sports, an associated entity graph 506 may include an association between winter sports and sports in general. In certain embodiments, the entity graph 506 may be generated based on inferences made by an inference engine utilizing information included in one or more databases and/or knowledge-based ontologies or taxonomies.

Figure 6:
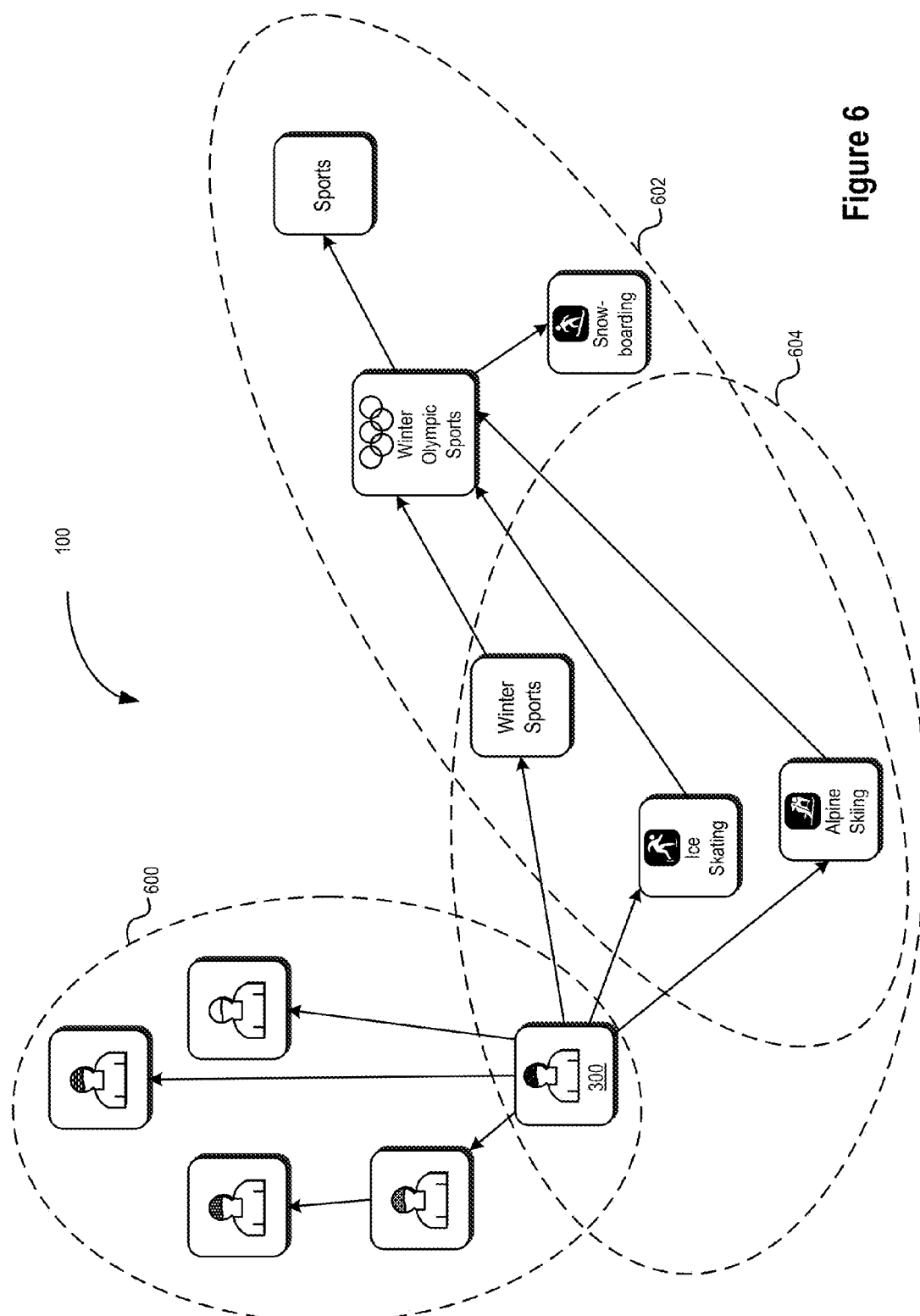
FIG. 6 illustrates an exemplary personal ontology graph comprising a plurality of layered graphs consistent with embodiments of the present disclosure.

FIG. 6 illustrates an exemplary personal ontology graph 100 comprising a plurality of layered graphs 600-604 consistent with embodiments of the present disclosure. As discussed above, the personal ontology graph 100 may include a plurality of associated ontology graphs 600-604. For example, as illustrated, the personal ontology graph 100 may include a social graph 600. The social graph 600 may include one or more connected person nodes associated with a user node 300 (e.g., person-to-person links), and may generally reflect the composition of a user's social, family, and/or professional network. Information included in the social graph 600 may be generated based, for example, on information derived from contact lists associated with one or more device applications associated with the user, information obtained from one or more accessible social network services associated with the user, and/or based on social relationships defined by the user.

The personal ontology graph 100 may further include an interest graph 604. The interest graph 604 may include one or more connected interest nodes associated with the user node 300 (e.g., person-to-interest links). For example, as illustrated, the user may have an interest in ice skating, alpine skiing, and/or winter sports as indicated by available personal information relating to the user. In certain embodiments, such information may be declared and/or volunteered by a user. In further embodiments, such information may be inferred (e.g., using an inference engine) based on available personal information relating to the user (e.g., television viewing history, browsing history, etc.).

The personal ontology graph 100 may further include an entity graph 602. The entity graph 602 may include one or more interconnected entities, interests, and/or concept nodes (e.g., interest-to-interest links). In certain embodiments, the entity graph 602 may be used to generate one or more higher-level inferences relating to a user node 300. For example, if a user has a declared interest in winter sports, based on information included in an interest graph 604 associated with the personal ontology graph 100, it may be inferred that the user will also have an interest in winter Olympic sports such as snowboarding. In certain embodiments, the entity graph 602 may be generated based on inferences made by an inference engine utilizing information included in one or more databases and/or other knowledge-based ontologies or taxonomies and/or resources (e.g., Freebase, Wikipedia, DBPedia, BabelNet, etc.).

By utilizing a plurality of layered and/or otherwise associated ontologies 600-604, the personal ontology graph 100 may provide a more rich, robust, and realistic model of an associated user's interests and/or behavior. This refined model of user interest and/or behavior may allow for more effective advertisement and/or other information targeting operations.

Content and Advertisement Targeting

Figure 7:
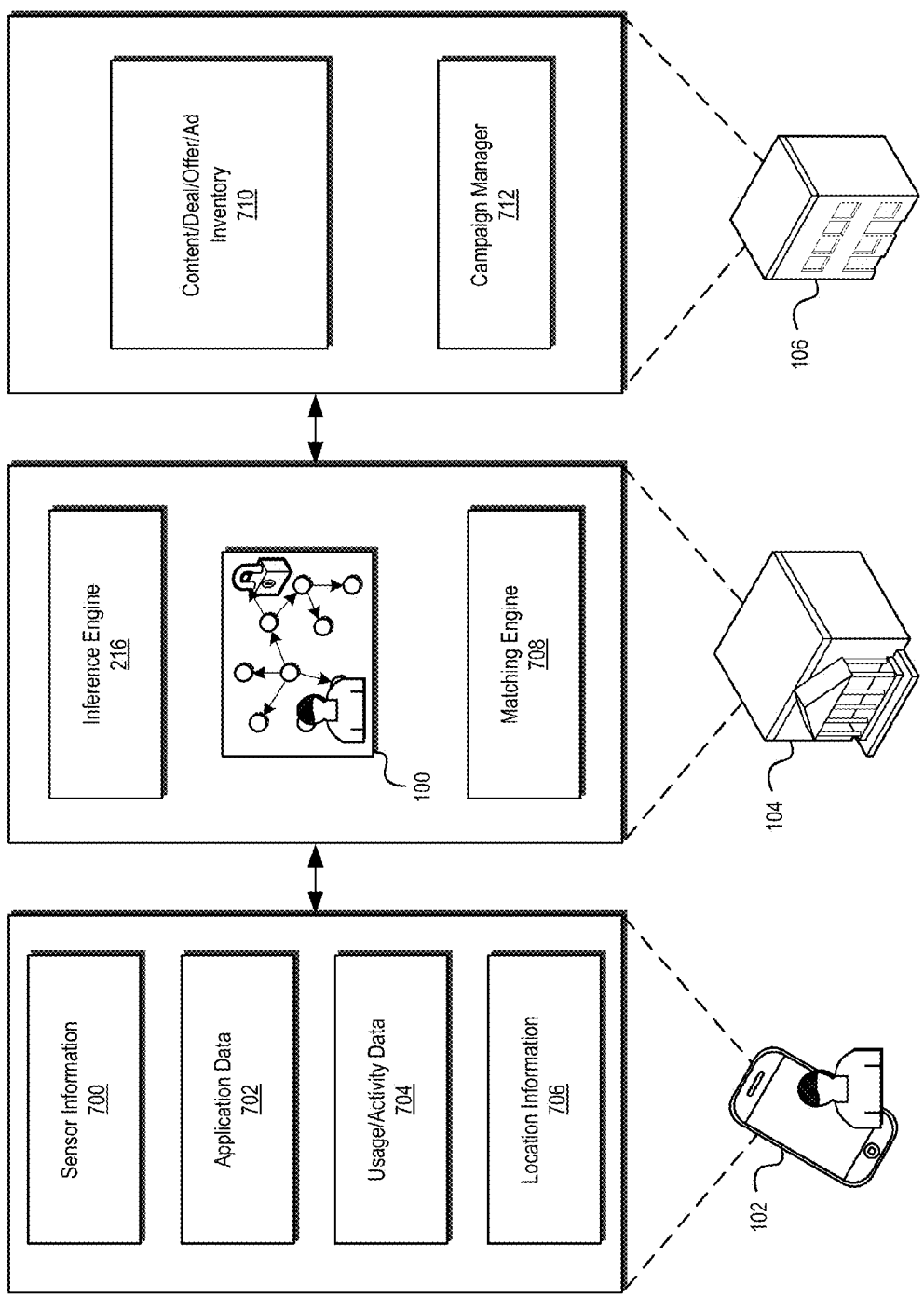
FIG. 7 illustrates exemplary components of a user device, a trusted service, and an advertising service consistent with embodiments of the present disclosure.

FIG. 7 illustrates exemplary components of a user device 102, a trusted service 104, and an content provider service 106 consistent with embodiments of the present disclosure. As illustrated, the user device 102, trusted service, 104, and content service 106 may be communicatively connected and configured to exchange various information in connection with advertisement and/or other information targeting operations consistent with embodiments disclosed herein.

The user device 102 may collect, among other things, a variety of personal information. This personal information may include, without limitation, sensor information 700, application data 702, usage and/or activity data 704, and/or location information 706. Sensor information 700 may include any information measured and/or collected by one or more sensors included in and/or associated with the user device 102. For example, the sensor information 700 may comprise information relating to an orientation of the device, an amount of light proximate to the device 102, and/or any other information relating to a dynamic environment proximate to the device 102.

Personal information generated by the user device 102 may further include application data 702. Application data 702 may comprise information regarding one or more applications installed and/or running on the user device 102. In some embodiments, application data 702 may be obtained by mapping one or more process identifiers associated with applications executing on the device with a database associating known process identifiers with particular applications. Application data 702 may further comprise statistical data regarding application usage, including, without limitation, frequency of application usage, duration of application use, and/or the like.

Usage and/or activity data 704 may further be generated by the user device 102. In certain embodiments, usage and/or activity data 704 may include, among other things, information collected by monitoring a user's activities in connection with the user device 102 and/or one or more services. For example, usage and/or activity data 704 may include, without limitation, a user's history of interactivity with ads and/or content, purchasing history, browsing history, content rendering history, and/or the like.

The user device 102 may further generate location information 706. Location information 706 may include information regarding a location of the user device 102 (e.g., as indicated by one or more location-based sensors, including GPS sensors or the like). For example, location information 706 may include one or more coordinates indicating a location of the user device 102. In further embodiments, the location information 706 may include one or more points of interests and/or named locations associated with the user device 102. Points of interest and/or named location information may be obtained by the user device 102, for example, by comparing measured coordinate locations of the user device 102 with one or more point of interest databases and/or directories.

Sensor information 700, application data 702, usage and/or activity data 704, and/or location information 706 may be transmitted from the user device 102 to the trusted service 104. Using the received information and data 700-706, the trusted service 104 may generate a personal ontology graph 100 relating to a user of the user device 102. In certain embodiments, an inference engine 216 operating on the trusted service 104 may be configured to generate inferred information included in the personal ontology graph 100 based, at least in part, on the received information and data 700-706. For example, the inference engine 216 may generate and include in the personal ontology graph 100, among other things, a variety of user inferred interests, characteristics, preferences, behavioral habits (e.g., schedules, travel patterns, etc.), and/or the like based on the received information and data 700-706. In some embodiments, the inference engine 216 may utilize contextual information included in the received information and data 700-706 to generate associated inferred information included in the personal ontology graph 100. In further embodiments, the inference engine 216 may utilize one or more inference rules, databases, and/or knowledge-based ontologies or taxonomies to generate inferences included in personal ontology graph 100.

The trusted service 104 may further include a matching engine 708. In some embodiments, the matching engine 708 may be configured to perform certain functions associated with an information targeting platform such as that described in the '406 application. For example, the matching engine 708 may be configured to match content, ads, offers, and/or deals 710 provided by a content service provider 106 or other associated party to a user based on the interests and/or behavior of the user as reflected in the personal ontology graph 100.

The service provider 106 may manage and/or track the progress of a content distribution campaign (e.g., a targeted advertising campaign) using a campaign manager 712. In certain embodiments, the campaign manager 712 may be a portal through which the service provider 106 may access campaign information managed by the trusted service 104. In certain embodiments, the campaign manager 712 may allow the service provider 106 to define parameters associated with a campaign including, for example, parameters relating to what content should be provided by matching engine 708 to what type of a user. Utilizing the campaign manager 712, the service provider 106 may tailor its campaign so that delivered content is well matched to a user's interests.

In some embodiments, the campaign manager 712 may allow the service provider 106 to define one or more inference rules utilized by inference engine 216 in drawing interest and behavioral inferences from available information and data 700-706 provided by user device 102. By allowing a service provider 106 to provide rules generating customized inferences, the campaign manager 712 may provide the service provider 106 with further control over the targeted delivery of content, ads, offers, deals, and/or other information 710 to a user of device 102.

The campaign manager 712 may further allow the service provider 106 to view and interact with performance metrics relating to a campaign. Performance metrics may include, for example, how well matched delivered information (e.g., an advertisement) is to a user's interests based on information reflected in the personal ontology graph 100, statistical information relating to delivered content (e.g., length, number of ads delivered, average user viewing time, etc.), and success rates of acceptance of ads and/or materials. By viewing performance metrics associated with a campaign, the service provider 106 may better understand how successful a campaign is and how well-targeted information is to a user and/or group of users.

In further embodiments, the campaign manager 712 may allow the service provider 106 to view anonymized and/or otherwise filtered information (e.g., demographic information) relating to a user and/or a group of users. In certain embodiments, anonymizing the personal information may comprise removing and/or filtering certain personally identifiable information from personal information reflected in the personal ontology graph 100 so that the information may not be used to uniquely identify (e.g., identify with a certain degree of specificity) the user of device 102. In some embodiments, anonymized personal information may include personal information associated with a user of the device 102 that may be used in the information targeting and/or content distribution methods disclosed herein, but not include personally identifiable and/or other information that may be used to uniquely identify the user. For example, in certain embodiments, anonymized personal information may include certain usage data relating to device 102, but not include a user's name, address, and/or any other personally identifiable information. Enabling a service provider 106 to view anonymized and/or otherwise filtered personal and/or demographic information relating to a user and/or a group of users may allow the service provider 106 to ascertain the effectiveness of its campaign and more directly tailor the campaign to a target audience.

Figure 8:
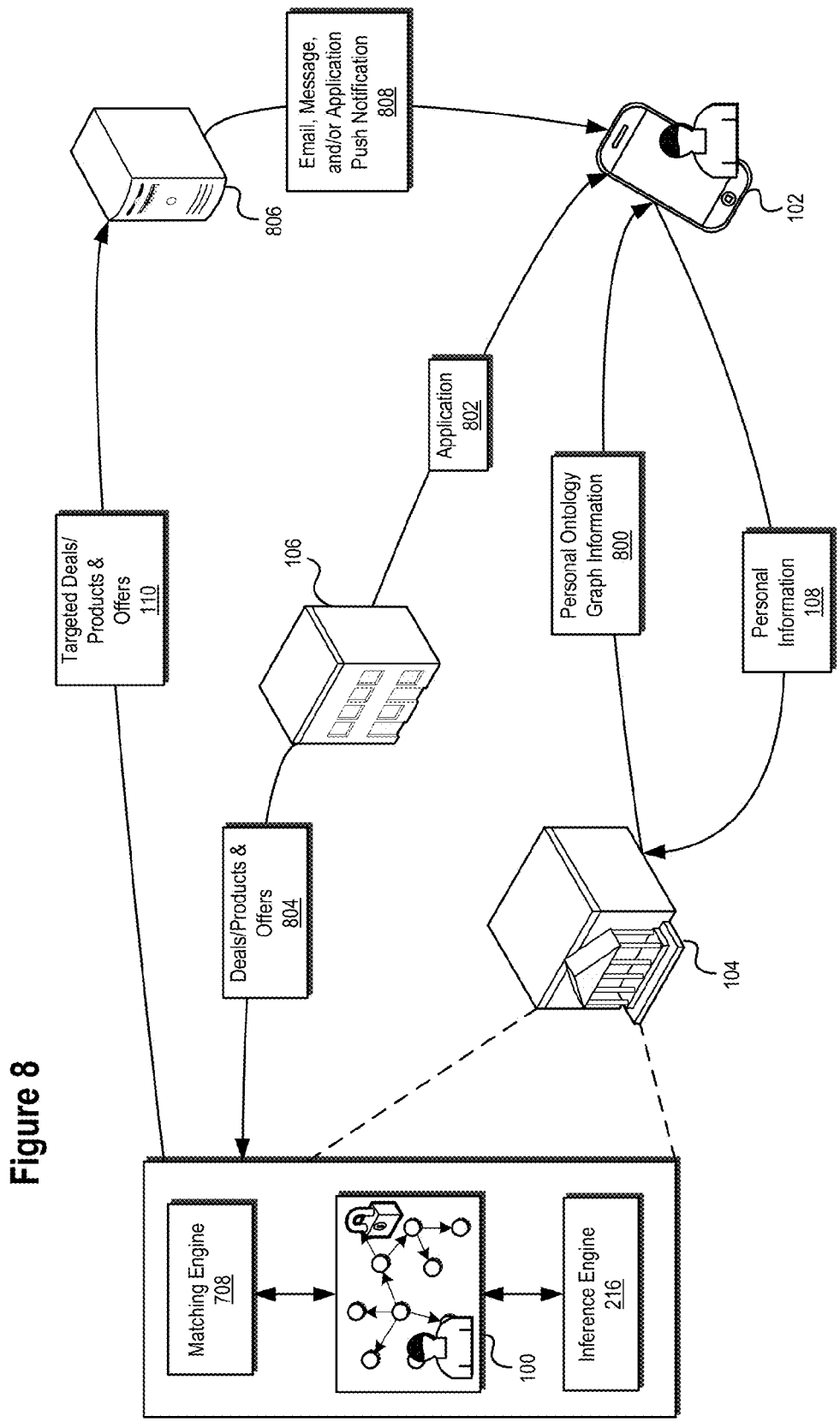
FIG. 8 illustrates an exemplary architecture for distributing advertisements and electronic content based on information included in a personal ontology graph consistent with embodiments of the present disclosure.

FIG. 8 illustrates an exemplary architecture for distributing advertisements and/or other electronic content 804 (e.g., targeted deals, products, advertisements, offers, etc.) based on information included in a personal ontology graph 100 consistent with embodiments of the present disclosure. As illustrated, the architecture may include a trusted service 104 communicatively coupled with a user device 102 and/or a content service provider 106. The trusted service 104 may perform a variety of functions, including, in some embodiments, functions associated with an information targeting platform such as that described in the '406 application and/or functions associated with the secure collection, use, management, and/or distribution of personal information relating to a user. In some embodiments, the trusted service 104 may perform certain functions associated with the generation and management of a personal ontology graph 100 associated with a user of user device 102.

As illustrated, the user device 102 may provide the trusted service 104 with personal information 108. Personal information 108 may include, among other things, information volunteered by a user (e.g., declared interests) and/or information collected by monitoring a user's activities in connection with an associated device 102 (e.g., device activity information). Based on the personal information 108 and using an inference engine 216, the trusted service 104 may generate a personal ontology graph 100 associated with a user of the device 102. As illustrated, in some embodiments, some and/or all of the information 800 included in the personal ontology graph 100 may be provided to the user device 102 upon request (e.g., via a personal agent application executing on the user device 102 or the like). In some embodiments, the user may have the ability to manage and/or control the management, distribution, and/or use of their personal information 108 and/or personal ontology graph 100 through various interactions with the trusted service 104.

A content service 106 may be communicatively coupled to the trusted service 104 and be configured to provide the trusted service 104 with a variety of advertisements and/or other electronic content 804 (e.g., deals, products, advertisements, offers, etc.). In further embodiments, the advertisement service 106 may provide campaign information, including, e.g., one or more rules relating to a content distribution campaign (e.g., advertisement matching rules and/or the like) for implementation by a matching engine 708 executing on the trusted service 104. Based on information included in the personal ontology graph 100 (e.g., user interests and/or behaviors), the matching engine 708 may match one or more content items (e.g., advertisements) to a user of device 102.

Matched and/or targeted advertisements and/or other electronic content 110 (e.g., targeted deals, products, advertisements, offers, etc.) may be sent to a notification server 806 which may be configured to communicate one or more messages 808 (e.g., e-mail messages, application notifications, etc.) conveying the targeted advertisement and/or content 110 to the device 102. In some embodiments, aspects of advertisement targeting and/or matching operations disclosed herein may be utilized in connection with an application 802 executing on the user device 102 provided by the advertisement service provider 106 and/or a related entity (e.g., a retailer, a content provider, etc.). Upon receipt of message 808 pertaining to a matched targeted advertisement or content, a notification may, for example, be provided to a user of the device 102 via a notification in application 802.

Figure 9:
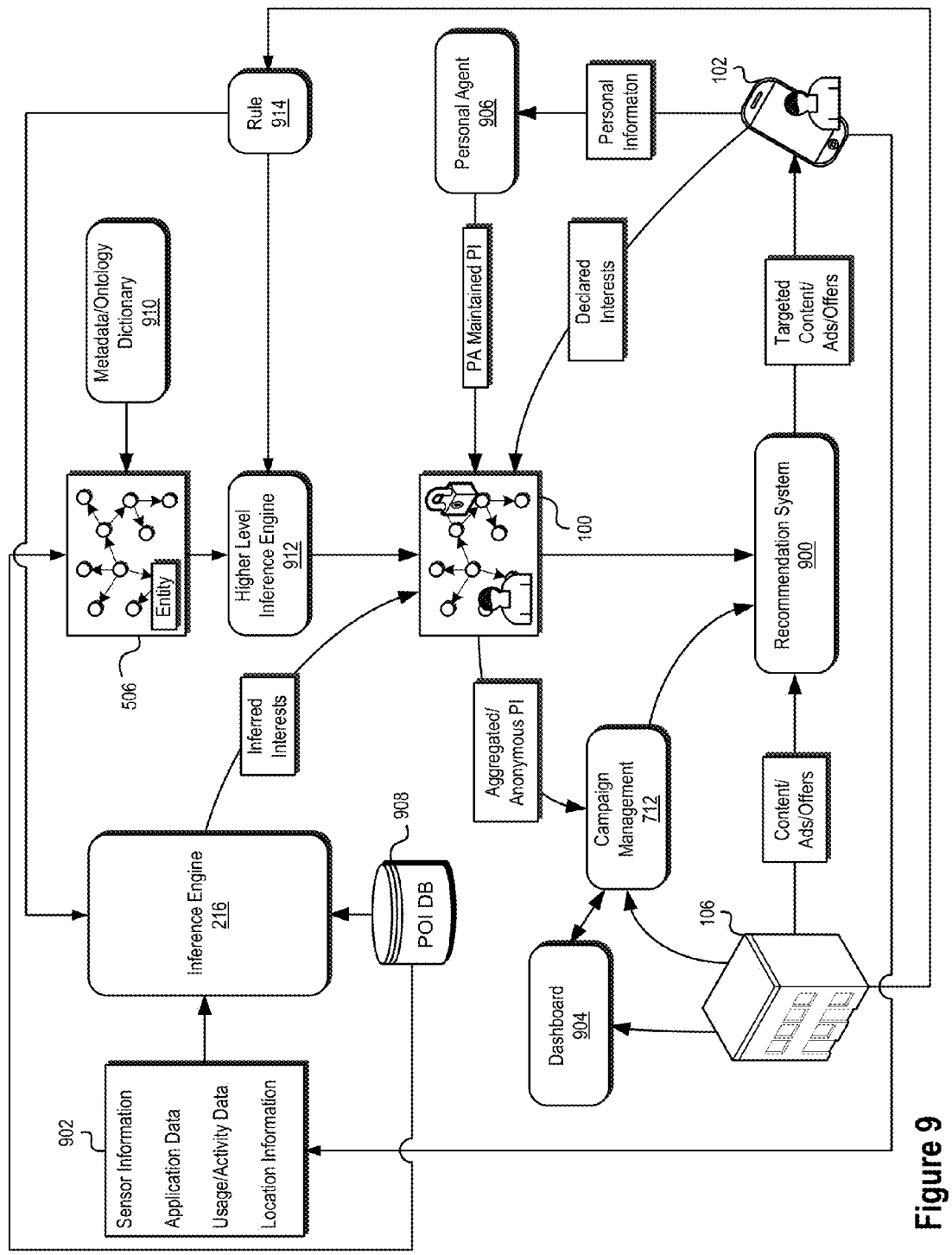
FIG. 9 illustrates a more detailed exemplary architecture for distributing advertisements and electronic content based on information included in a personal ontology graph consistent with embodiments of the present disclosure.

FIG. 9 illustrates a more detailed exemplary architecture for distributing advertisements and other electronic content based on information included in a personal ontology graph 100 consistent with embodiments of the present disclosure. The components of the architecture illustrated in FIG. 9 may be associated with and/or distributed between a variety of systems and/or services and arranged in a variety of ways. In some embodiments, the illustrated components may be associated with one or more user devices 102, trusted services, and/or advertisement or other information service providers 106.

Personal information may be directly provided for use in a personal ontology graph 100 by a user device 102 after being transformed into an appropriate structure associated with other information included the personal ontology graph 100. The personal information may include information volunteered by a user and information collected by monitoring a user's activities in connection with the device 102. In some embodiments, a user device 102 may provide a personal agent 906 executing on the device 102 and/or on a trusted service with certain personal information. The personal agent 906 may transmit such maintained personal information to a trusted system managing the personal ontology graph 100 for inclusion in the graph. In further embodiments, the user system 102 may provide personal information (e.g., declared interests) to a trusted system managing the personal ontology graph 100 directly without the use of a personal agent 906.

As illustrated, the user device 102 may transmit certain personal information 902 to an inference engine 216 that, in some embodiments, may be associated with a trusted service. The personal information 902 may, for example, include information volunteered by a user (e.g., declared interests) and information collected by monitoring a user's activities in connection with an associated device (e.g., various sensor, application, and usage information, etc.). For example, the personal information 902 transmitted to the inference engine 216 may include, without limitation, sensor information (e.g., information measured and/or collected by one or more sensors included in and/or associated with the user device 102), application data (e.g., information regarding one or more applications installed and/or running on the user device 102), usage and/or activity data (e.g., information collected by monitoring a user's activities in connection with the user device 102 and/or one or more services), location information (e.g., information regarding a location of the user device 102), and/or the like. Based at least in part on the personal information 902, the inference engine 216 may generate one or more inferred interests that may be included in a personal ontology graph 100. In certain embodiments, the personal ontology graph 100 may be secured and/or otherwise encrypted.

The inference engine 216 may utilize a variety of information in generating inferred interests based on available personal information 902. For example, in some embodiments, the inference engine 216 may interact with one or more databases and/or knowledge-based ontologies or taxonomies to generate inferences included in the personal ontology graph 100. As illustrated, the inference engine 216 may, for example, interact with a point of interest database 908 in generating inferences based on available personal information 902. For example, the inference engine 216 may utilize a point of interest directory associated with point of interest database 908 in conjunction with measured coordinate locations of the user device 102 indicated by sensor information to identify a point of interest and/or location of the device 102 and/or derive inferences therefrom.

In further embodiments, the inference engine 216 may receive one or more rules 914 used to generate inferences to be included in personal ontology graph 100. For example, as illustrated, an advertisement or other information service provider 106 may provide one more or rules 914 to the inference engine 216 used to derive inferences from available personal information 902. In one example, a rule 914 may articulate that if certain information is included in personal information 902 provided to the inference engine 216, the inference engine 216 should make a particular inference. For example, a rule 914 may articulate that if a user has an application for watching streaming movies on their device 102 (e.g., as reflected by application data included in available personal information 902), then it should be inferred that the user likes movies.

In some embodiments, the personal ontology graph 100 may be further populated based on inferred interests provided by a higher level inference engine 912. In certain embodiments, the higher level inference engine 912 may draw from a variety of resources in populating personal ontology graph 100 with user behavioral and interest information (e.g., inference rules, databases, and/or knowledge-based ontologies or taxonomies). For example, in some embodiments, the higher level inference engine 912 may utilize information included in one or more entity graphs 506 defining one or more relationships between entities and/or concepts. In certain embodiments, the entity graph 506 may be populated, for example, by information included in one more metadata/ontology dictionaries and/or taxonomies 910 and/or points of interest databases 908. In some embodiments, inferred interests generated by the higher level inference engine 912 may be further based on one or more rules 914 articulated, for example, by a service provider 106, the user, and/or the like.

Based on information included in the personal ontology graph 100 and received campaign information, advertisements and/or other content may be matched to a user's interests and transmitted to the user device 102 for rendering (e.g., rendering in connection with certain content and/or the like). For example, via a campaign manager 712 and/or an associated dashboard interface 904, a service provider 106 may interact with a recommendation and/or matching system 900. The recommendation and/or matching system 900 may receive content, advertisements, offers, and/or the like from the service provider 106 and, based on information included in the personal ontology graph 100, match such content, advertisements, offers, etc. based on the interests of a user of the device 102 as reflected in the personal ontology graph 100. In some embodiments, targeted and/or matched content, advertisements, offers, etc. may be distributed to the device 102 by the recommendation and/or matching system 900 and/or another system (e.g., service provider 106 and/or a service operating on its behalf).

In certain embodiments, a service provider 106 may view, via the campaign manager 712 and/or a dashboard 904 associated therewith, anonymized and/or otherwise filtered information (e.g., demographic information) relating to a user and/or a group of users. Enabling a service provider 106 to view anonymized and/or otherwise filtered personal and/or demographic information relating to a user and/or a group of users may allow the service provider 106 to ascertain the effectiveness of its campaign and more directly tailor the campaign to a target audience.

It will be appreciated that a number of variations can be made to the architecture and relationships presented in connection with FIG. 9 within the scope of the inventive body of work. Although described above in context of advertisement targeting, further embodiments may be utilized in connection with other information and/or content targeting operations, including content targeting operations that do not necessarily involve targeting and/or matching advertisements to a user's interests. Thus it will be appreciated that FIG. 9 is provided for purposes of illustration and explanation, and not limitation.

Figure 10:
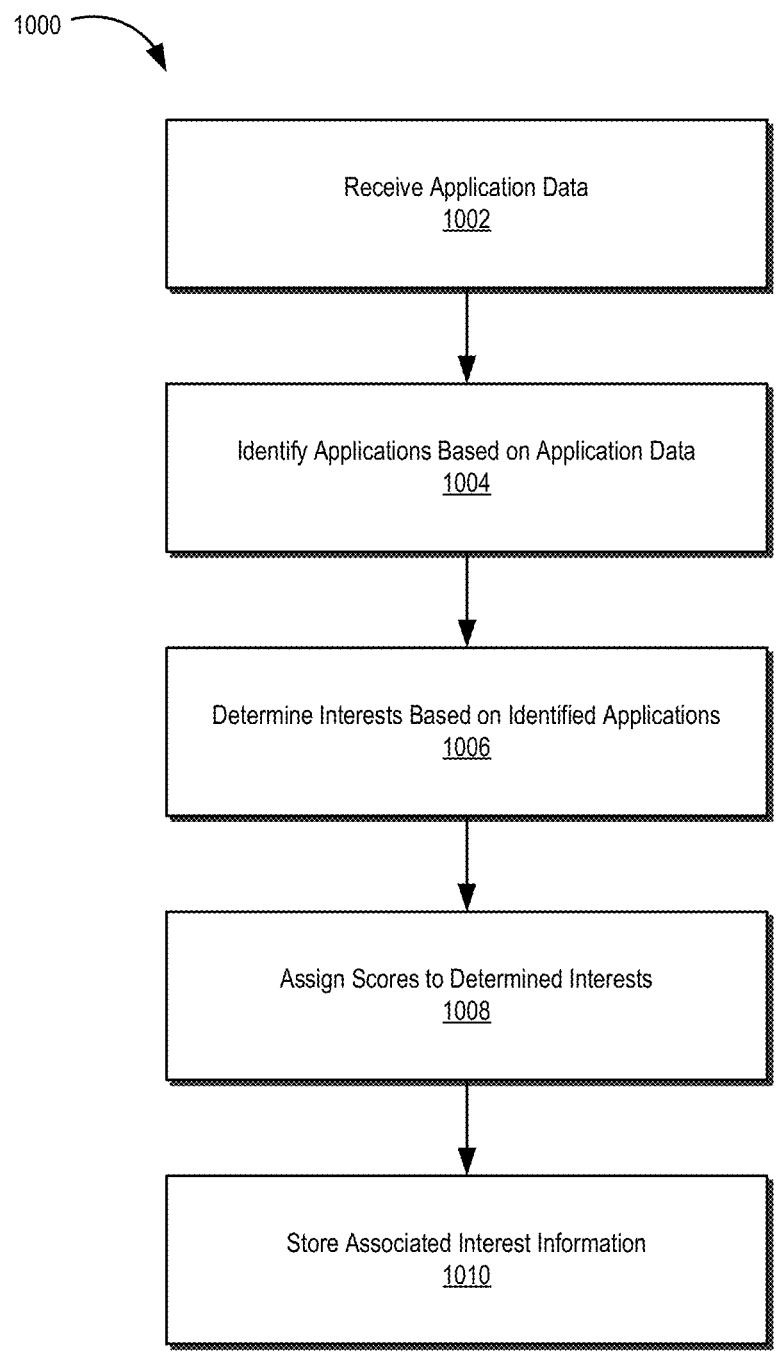
FIG. 10 illustrates a flow chart of an exemplary method for generating interest information included in a personal ontology graph based on available application information consistent with embodiments disclosed herein.

FIG. 10 illustrates a flow chart of an exemplary method 1000 for generating interest information included in a personal ontology graph based on available application information consistent with embodiments disclosed herein. The illustrated method 1000 may be implemented in a variety of ways, including using software, firmware, hardware, and/or any combination thereof. In certain embodiments, the method 1000 may be implemented by a trusted service and/or a user device executing an inference engine as described above.

At 1002, application data may be received. The application data may comprise information regarding one or more applications installed and/or running on a user device. In certain embodiments, the application data may comprise one or more process identifiers associated with applications executing on the device.

At 1004, one or more applications installed and/or running on the device may be identified based on information included in the application data received at 1002. For example, in certain embodiments, one or more process identifiers associated with the application data may be mapped to one or more applications based on information included in a database associating known process identifiers with particular applications.

Based on the applications identified at 1004, one or more interests associated with the user may be determined at 1006. In certain embodiments, one or more interests may be determined using an inference engine. In some embodiments, the inference engine may utilize contextual information associated with the applications to infer certain interests of a user based on the applications. For example, if a user device is running an application that facilitates viewing of streaming movies on the device, the inference engine may infer that the user likes movies. In further embodiments, the inference engine may utilize one or more inference rules, databases, and/or knowledge-based ontologies or taxonomies to identify interests based on the applications identified at 1004.

At 1008, one or more scores and/or weights may be assigned to interests identified at 1006. In certain embodiments, the scores and/or weights may reflect the strength of an association between the user and the identified interests (e.g., a strength of inferred relationships). For example, if a user uses an application on a daily basis, interests inferred based on use of the application may be given a relatively high score, whereas interests inferred based on an application used infrequently may be given a relatively low score. In some embodiments, scores and/or weights associated with interests may decay over time. In further embodiments, association of interests identified based on information provided and/or volunteered by a user (e.g., declared interest) may be given a relatively higher score and/or weight than those derived from other contextual information.

At 1010, interest information associated with interests determined at 1006 and scores determined at 1008 may be stored. For example, consistent with embodiments disclosed herein, interest information may be stored in a personal ontology graph or other data store associated with the user. Based on information included in the personal ontology graph, advertisement and/or other content targeting operations may be performed.

Figure 11:
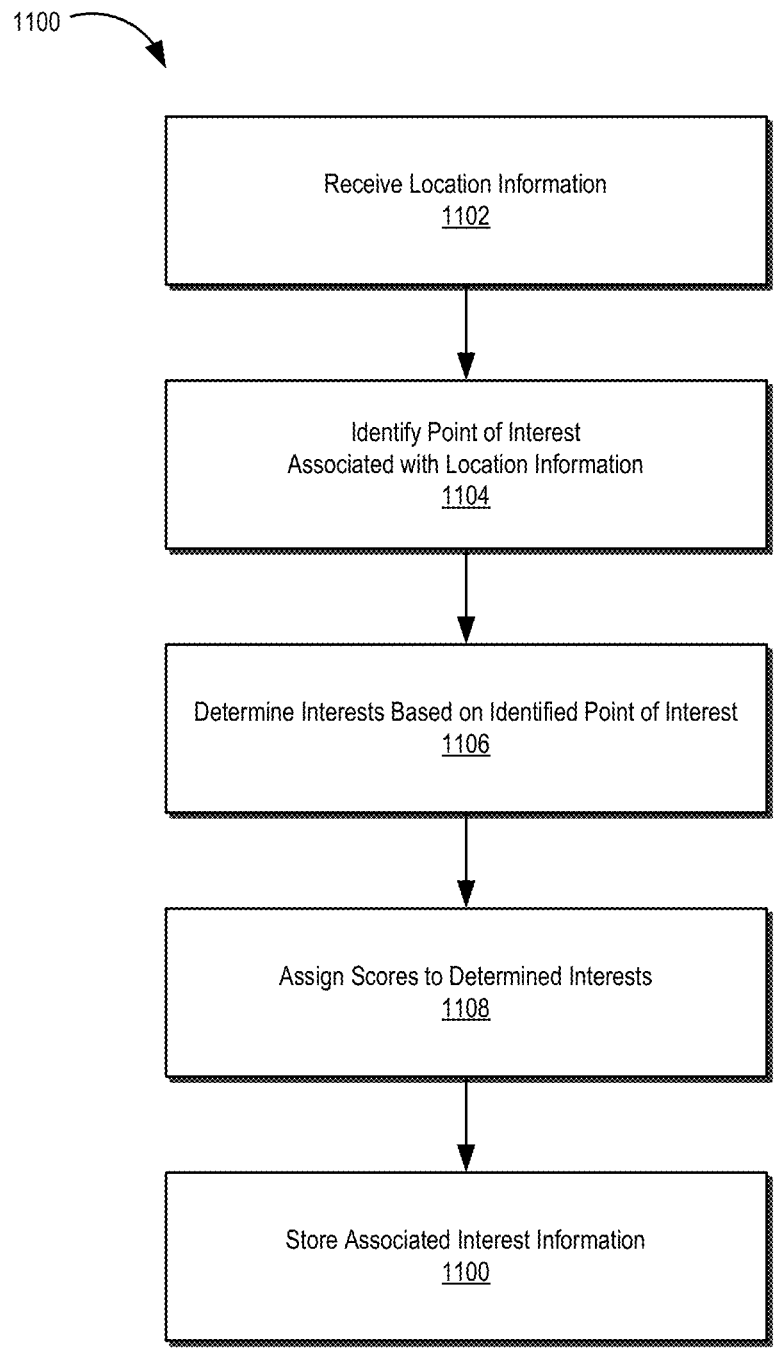
FIG. 11 illustrates a flow chart of an exemplary method for generating interest information included in a personal ontology graph based on available location information consistent with embodiments disclosed herein.

FIG. 11 illustrates a flow chart of an exemplary method 1100 for generating interest information included in a personal ontology graph based on available location information consistent with embodiments disclosed herein. The illustrated method 1100 may be implemented in a variety of ways, including using software, firmware, hardware, and/or any combination thereof. In certain embodiments, the method 1100 may be implemented by a trusted service and/or a user device executing an inference engine as described above.

At 1102, location information may be received. The location information may include one or more coordinates indicating a location of an associated user device (e.g., GPS coordinates). For example, in some embodiments, the location information may comprise a latitude and a longitude associated with a location of a user device.

At 1104, one or more points of interests may be identified based on the location information received at 1102. In certain embodiments, the coordinate information may be converted to a geo-hash value. Based on the coordinate information and/or the geo-hash value, one or more points of interest databases and/or directories may be utilized to identify an associated point of interest (e.g., the name of the location).

At 1106, one or more interests associated with the point of interest identified at 1104 may be determined. In certain embodiments, the one or more interests may be identified using an inference engine. The inference engine may utilize contextual information associated with the point of interest to infer user interests based on the identified point of interest. For example, in some embodiments, an identified point of interest may have certain associated metadata relating to the point of interest (e.g., metadata provided by a point of interest database and/or directory). Metadata may provide, for example, a name of a point of interest, a category of a point of interest (e.g., restaurant, office, gym, etc.), activities associated with the point of interest, and/or any other information relating to the point of interest. Based on this metadata, one or more user interests may be determined. In further embodiments, the inference engine may utilize one or more inference rules, databases, and/or knowledge-based ontologies or taxonomies to identify interests based on identified points of interest.

At 1108, one or more scores and/or weights may be assigned to interests identified at 1106. In certain embodiments, the scores and/or weights may reflect a strength of an association between the user and/or identified interests (e.g., a strength of inferred relationships). For example, if a user visits a point of interest on a daily basis, interests inferred from the point of interest may be given a relatively high score, whereas interests inferred based on points of interest visited infrequently may be given a relatively low score. In some embodiments, scores and/or weights associated with interests may decay over time.

At 1110, interest information associated with interests determined at 1106 and scores determined at 1108 may be stored. For example, consistent with embodiments disclosed herein, interest information may be stored in a personal ontology graph or other data store associated with the user. Based on information included in the personal ontology graph, advertisement and other content targeting operations may be performed.

Personal Agent

In some embodiments, a personal agent, such as that described in the '406 application, may be used to manage personal information and/or a personal ontology graph associated with a user. A user's privacy may be maintained because only the personal agent has direct access to personal information and/or the personal ontology graph. Users may have control over what personal information is exposed from the personal agent to other entities (e.g., advertisement service providers). In certain embodiments, the personal agent may be used to mediate between advertisement providers and a user's personal information in a scalable manner.

A personal agent may be implemented in a variety of ways to collect, store, and/or manage personal information. In some embodiments, a personal agent may be implemented as an agent that runs locally on a device such as a background service configured to monitor events and collect information from a variety of sources including, for example, direct user input, user contents, user actions, web browsing and/or searches, and/or the like. In further embodiments, a personal agent may be implemented as a network service that interacts with services (e.g., social networks and/or the like) and collects information related to a user profile, friends, groups, recommendations, and/or the like.

In some embodiments, a personal agent may be a distributed software component that works for an individual user and is controlled by that user. The personal agent may be a distributed component because it may comprise software that runs on various devices (e.g., a user device) associated with a user as well as on secure servers (e.g., trusted systems) in the cloud that host personal agent capabilities. In certain embodiments, a user may be associated with a plurality of personal agents. In one embodiment, the architecture of a system allows the personal agent to be associated with a user's email address and/or a pseudonym of a user's choice, thereby providing separation from any external identity information.

In some embodiments, the personal agent may collect information about a user, but may not reveal it to anyone except the user, and may work in conjunction with advertisement and content matching services utilizing personal information including a personal ontology graph. As discussed above, the personal agent may perform matching operations rather than advertisers or other third party service providers. In this manner, the personal agent may function as a trusted intermediary.

In one embodiment, a personal agent serves as a trusted intermediary that is relied upon by two or more stakeholders to perform certain actions for the benefit of those stakeholders. The reliance generally includes certain provisions regarding those actions. For example, in one embodiment, a personal agent can have three classes of stakeholders: 1) a user whose information the personal agent collects and classifies, 2) advertisers, merchandisers, etc., who want to inform the user about their products and services, and optionally 3) service and content providers who provide content that is ultimately paid for in whole or part by advertisers who advertise through a personal agent.

In the systems and methods disclosed herein, a personal agent may generate a sophisticated and personal profile of a user's interests and other attributes that may be embodied in a personal ontology graph. In some embodiments, the user may correct and curate the generated profile and/or personal ontology graph. The personal agent may find advertisements, merchandise, content, etc. having attributes are that are well-matched to attributes and interests associated with a user personal agent (e.g., as represented in the personal ontology graph). In some embodiments, the personal agent may rank those matches according to objective functions that may be established in a commercial context. For example, a personal agent can run a real-time auction for ad slots in a TV program. The TV program provider can specify an objective function that the personal agent will use to rank bids from advertisers. This is just one of many examples of relationships and interactions among a personal agent and other stakeholders.

In some embodiments, the personal agent may be trusted to, among other things, protect and/or secure personal information and inferences derived therefrom (e.g., as reflected in a personal ontology graph), prevent unauthorized access to personal information and associated inferences by third parties, provide a user with a mechanism to view their personal information and/or an associated personal ontology graph and to control the use of information included therein, and/or the like. An advertiser, merchandiser, and/or other service may trust the personal agent to effectively match their interest criteria with interests associated with a user, accurately apply objective functions used in auctions, effectively rank advertisements, deals, content, etc. that are presented to a user in a commercial context, and/or the like. In situations where service and content providers rely on the personal agent to choose or auction ad slots that monetize their content or service, the service or content provider may trust the personal agent to properly maximize the objective function in the selection of ads.

In some embodiments, advertisers and/or other content providers may want to know when and in what context an advertisement was presented to a user. This may include, for example, some of the attributes that were used to match the ad to a particular user. The personal agent may securely provide such information in a manner that does not include personally identifiable information associated with the user.

In some embodiments, it may be desirable to provide the user with the ability to control what personal information is divulged and to whom, and to control how the information is used. For example, a user may not want a certain attribute and/or interest to be used in targeting advertising services, even though the privacy of the information will be maintained by a personal agent. Embodiments of the personal agent may allow a user to implement such controls over the use of their personal information.

In some embodiments, the personal agent may distinguish between interests and attributes that are self-declared as opposed to those that are inferred or computed from raw data. In some circumstances, an advertiser might choose to give preference to self-declared or inferred information in different contexts. For example, for some attributes, a person might self-declare misleading information (such as "I like to hike on weekends"). An outdoors specialty merchandiser, however, may choose to ignore certain self-declared interest in favor of targeting users who are observed, by their personal agent, to actually hike in the wilderness every weekend, or very often. On the other hand, certain attributes may be difficult to infer accurately, and in that case the advertiser might choose to target a self-declared interest than an inferred interest.

System and methods disclosed herein may allow for the collection of large amounts of user personal information to be used for information targeting, targeted advertising, recommending products and services, and personalizing services. Since, in some embodiments, data is protected and effectively not shared, and since the user controls the use of that data through the personal agent, privacy may be deeply and extensively preserved. In certain embodiments, the personal agent may access a significant amount of information obtained by a device including, without limitation, location data, transaction data, and/or any other data associated with a user and/or a user's interactions with of a device. To protect user privacy, in some embodiments, a personal agent may, without limitation:

Discard information that is not useful for making inferences about a user's interests and/or behaviors (e.g., location data that has already been used to draw inferences, etc.).

Discard data and/or inferences that a user indicates they would not like to retain.

Maintain personal information and/or an associated personal ontology graph in a controlled and/or secured environment.

Not share the data with untrusted services and/or devices.

In some embodiments, the personal agent will destroy a user's data and inferences derived from it upon request by the user. A user may further direct a personal agent to liquidate its own instance. A user may then create a new personal agent, for example, under a new pseudonym. The personal agent may further be designed to be discrete. For example, requests and queries made by the personal agent (e.g., in the context of searches performed by the personal agent or the like), may not include the source of the requests. For example, the personal agent may utilize incognito searches, secure proxy servers, and the like.

A personal agent can be used by services and applications to find advertising and other content that is most appropriate for a user in their current situation, including, for example, a current time and/or place (e.g., as determined by one or more location-based sensors), device, and/or content or activity a user may be engaging in, and/or the like. In one embodiment, the personal agent may be active in pulling the information that is appropriate for a user. The personal agent may search for best matched information (e.g., advertisements), and when auctions are used, the best price may be determined for the advertisements that are the most relevant in the current context. Personal agents may cache personalized and contextualized advertisements for use on many devices, not just the device where a cookie is stored.

An aspect of the efficiency of certain embodiments of the systems and methods disclosed herein is the diversity and decentralization of methods for determining relevance and for personalizing advertisements and recommendations. In some embodiments, one or more software development kits ("SDKs") and/or application programming interfaces ("APIs") may be published that allow others to devise ways for applying recommendation and matching methodologies, so that a matching algorithm can be sent to are user's personal agent for implementation. This may be utilized for auctions as well as for non-competitive relevance ranking, and effectively may allow a personal agent to learn and become smarter over time. In some embodiments, this process can be enabled further by publishing and referring to standardized taxonomies for interests and personal attributes, along with ontologies for products and services. This may enable third parties to make each personal agent more intelligent in its ability to derive inferred interests and/or target advertisements and content.

Policy-Driven Systems and Methods

Embodiments of the systems and methods disclosed herein may be utilized to ensure that some or all of the above-described considerations for collection and sharing of personal information are followed through one or more personal information collection, distribution, and/or usage policies that govern these activities. For example, in some embodiments, rules regarding the collection and/or distribution of personal information, including information stored in a personal ontology graph, may be articulated in one or more policies enforced by the systems and/or devices in a content and/or advertisement ecosystem. Such a policy-driven system may, among other things, enable the automated collection and sharing of personal information in accordance with local laws and regulations and/or user preferences. By using a policy-driven system under control of a user, the user may manage the collection and use of their personal information.

In certain embodiments, data flows within the system may occur in a policy-driven manner. In some embodiments, this may allow for the system to comply with local laws, privacy regulations, and/or user preferences regarding the management, distribution, and/or use of personal information. Exemplary policies that may be implemented by the systems and methods disclosed herein may include, without limitation, policies regarding what information may be collected by a device and how such information is collected (e.g., what types of personal information is collected, the conditions under which the personal information is collected, etc.), how the personal information may be used, limitations on collection of personal information (e.g., how many days of personal information should be collected, how long it should be retained, size limits on collected information, whether users can set/modify these limits, whether users can opt-in/opt-out of collection activities, any/or any other desired limitations), and/or the like.

User Device Integration

As discussed above, a personal ontology graph consistent with embodiments disclosed herein may create private representations of a user's behavior, interests, and/or demographics based on a variety of available information. The personal ontology graph may utilize information volunteered by a user (e.g., declared interests) and information collected by monitoring a user's activities in connection with an associated device, as well as various inferred information (e.g., inferred interests) relating to the user.

Figure 12:
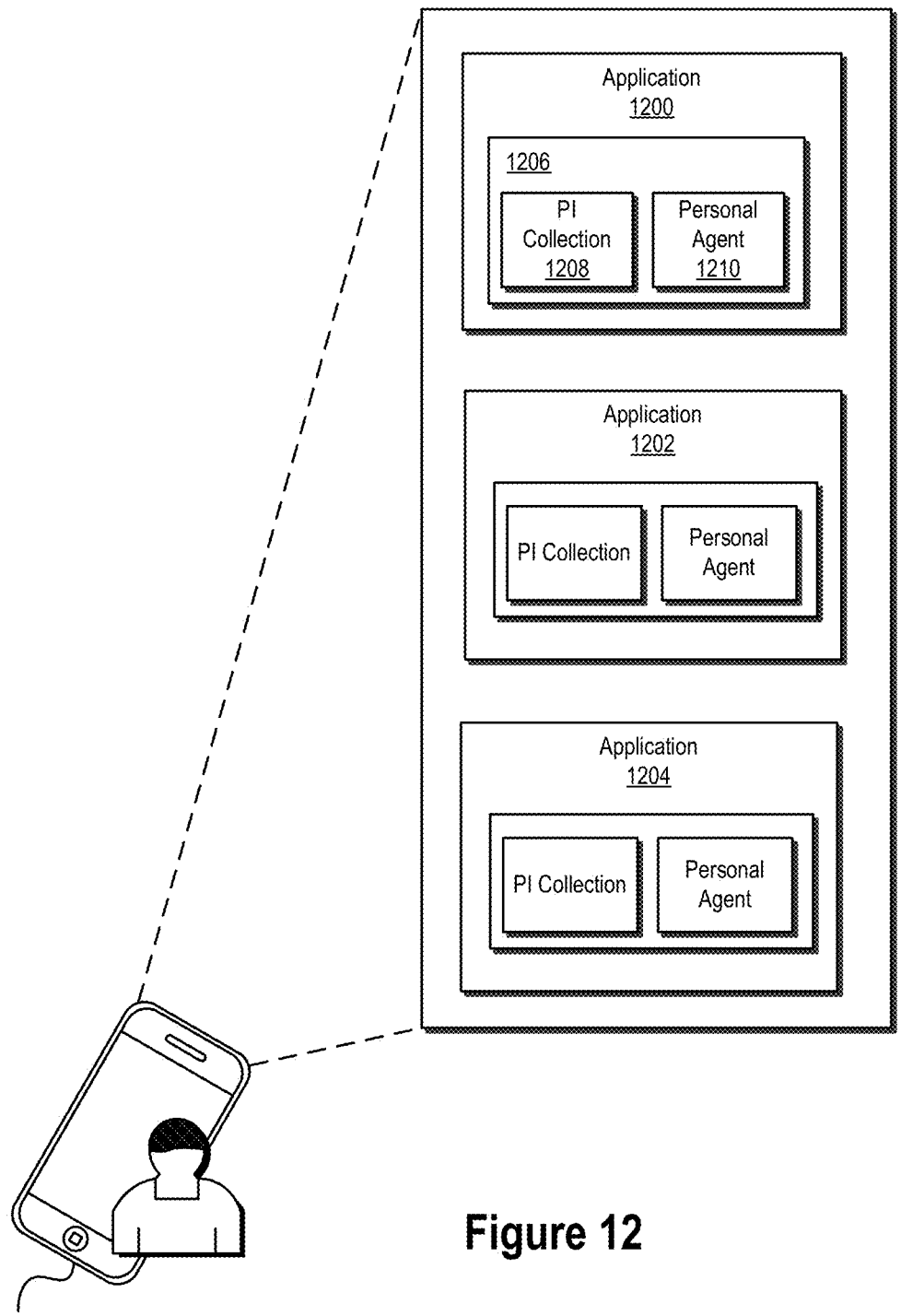
FIG. 12 illustrates integration of certain systems and methods disclosed herein into a plurality of applications executing on a user device.

Certain embodiments of the systems and methods disclosed herein may be integrated into a variety of applications executing on a user's device (e.g., using an SDK or the like). For example, as illustrated in FIG. 12, a user device 102 may have a variety of installed applications 1200-1204. The installed applications 1200-1204 may be provided to the user device 102 from a variety of parties and services. For example, a first application may be provided by a streaming movie service, a second application may be provided by a retailer, and a third application may be provided by a targeted offer provider. In some embodiments, the parties and services providing applications 1200-1204 may be unrelated entities.

Embodiments of the systems and methods disclosed herein may be included as components of applications 1200-1204. In some instances, components of applications 1200-1204 implementing the systems and methods disclosed herein may be integrated into the applications 1200-1204 using an appropriate SDK. For example, application 1200 may include a component 1206 implementing certain embodiments of the systems and methods disclosed herein. The component 1206 may include, for example, a module implementing personal information collection 1208 and a module implementing a personal agent 1210. In certain embodiments, functionality associated with the personal information collection 1208 and personal agent 1210 modules may be associated with a single module.

The personal information collection module 1208 may collect personal information volunteered by a user and/or information collected by monitoring a user's activities in connection with an associated device (e.g., device activity information). For example, the personal information collection module 1208 may collect, among other things, sensor information, application data, usage and/or activity data, and/or location information. In certain embodiments, the personal information collection module 1208 may collect personal information associated with the use of an application 1200 the module 1208 is associated with. For example, if application 1200 interfaces with one or more device 102 sensors in its operation, such information may be collected by personal information collection module 1208 in conjunction with application data associated with application 1200.

The personal agent module 1210 may implement functionality associated with a personal agent as disclosed herein. In some embodiments, the modules 1208, 1210 may allow for collection of personal information while an associated application 1200 is actively running on the device 102. In further embodiments, the modules 1208, 1210 may allow for collection of personal information while an associated application 1200 is running in a background of the device 102.

Information collected by modules 1208, 1210 may be provided to a trusted service for use in connection with generating a personal ontology graph consistent with embodiments disclosed herein. In certain embodiments, component 1206 and/or modules 1208, 1210 may interface with the trusted service via a public API exposed by the service. In some embodiments, such an interface may present itself to components 1206 and/or modules 1208, 1210 as a set of logically grouped objective-C classes and/or protocols.

In some embodiments, information provided by a particular application component and/or its constituent modules may be utilized to generate associated inferences included in a personal ontology graph. In some embodiments, a service associated with an application may be able to configure what information the component and/or its constituent modules may be capable of collecting in connection with the application. For example, the service may configure certain sensor information used in connection with the application to be collected by modules 1208, 1210 and disable collection of other sensor information.

A service associated with the application may further have certain control over the use of such information by other services and/or entities. For example, a particular entity's service may provide the trusted service with an indication that information derived from its application should not be made available for use by other services in connection with information targeting operations. In other circumstances, however, a service may allow other services and/or entities to utilize personal information collected by its application in connection with information targeting services (e.g., based on reciprocal relationships and/or the like). By allowing personal information gathered by a component included in an application to be used by other services and/or entities in information targeting operations, a more detailed and robust model of the user's interests and behaviors may be built in the personal ontology graph to the benefit of all services utilizing the systems and methods disclosed herein.

Figure 13:
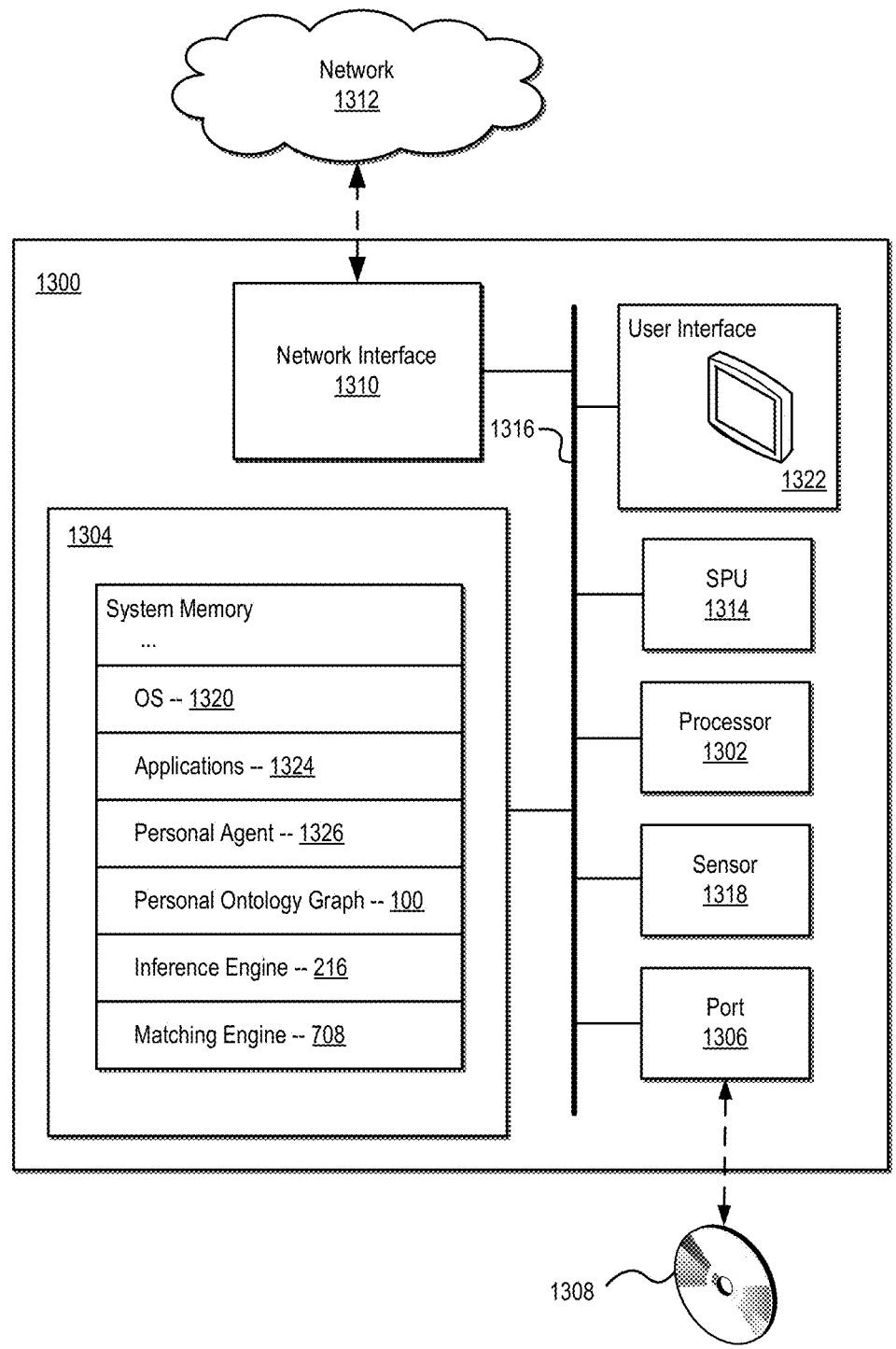
FIG. 13 illustrates a system that may be used to implement certain embodiments of the systems and methods of the present disclosure.

FIG. 13 illustrates a system 1300 that may be used to implement certain embodiments of the systems and methods of the present disclosure. The exemplary system 1300 may comprise a mobile device and/or a user device configured to perform the personal information collection, use, and management operations and/or the advertisement and content targeting methods disclosed herein. The system 1300 may, for example, comprise a cellular telephone, PDA, portable audio or video player, electronic book reader, tablet, gaming system, computer system, and/or any other system configured to implement the systems and methods described herein. In certain embodiments, the system 1300 may perform certain functions associated with a user device and/or a trusted service as disclosed herein.

As illustrated in FIG. 13, system 1300 may include: a processor 1302; system memory 1304, which may include some combination of high speed RAM, non-volatile memory and/or one or more bulk non-volatile computer-readable storage mediums (e.g., a hard disk, flash memory, etc.) for storing programs and other data for use and execution by the processor 1302; a user interface 1322 that may include a display and/or one or more input devices such as, for example, a touchscreen, a keyboard, a mouse, a track pad, and the like; a port 1306 for interfacing with removable memory 1308 that may include one more diskettes, optical storage mediums (e.g., compact discs, DVDs, etc.), and/or other computer-readable storage mediums (e.g., flash memory, thumb drives, USB dongles, etc.); a network interface 1310 for communicating with other systems via a network 1312 using one or more communication technologies; one or more sensors 1318 that may comprise one or more location sensors and/or any other sensor system including, for example, any of the sensor systems disclosed herein; and one or more buses 1316 for communicatively coupling the aforementioned elements.

In certain embodiments, network 1312 may comprise the Internet, a local area network, a virtual private network, a cellular communications network, a WiFi network, and/or any other communication network utilizing one or more electronic communication technologies and/or standards (e.g., Ethernet or the like). In some embodiments, the network interface 1310 and/or network 1312 may be part of a wireless carrier system, such as a PCS, and/or any other suitable communication system incorporating any suitable communication standards and/or protocols. In further embodiments, the network interface 1310 and/or network 1312 may be part of an analog mobile communications network and/or a digital mobile communications network utilizing, for example, CDMA, GSM, FDMA, and/or TDMA standards. In still further embodiments, the network interface 1310 and/or network 1312 may incorporate one or more satellite communication links and/or utilize IEEE's 802.11 standards, near-field communication, Bluetooth®, UWB, Zigbee®, and or any other suitable standards or technologies.

In some embodiments, the system 1300 may, alternatively or in addition, include a secure processing unit ("SPU") 1314 that is protected from tampering by a user of system 1300 or other entities by utilizing secure physical and/or virtual security techniques. An SPU 1314 can help enhance and/or facilitate the security of sensitive operations such as private management of private personal information, and other aspects of the systems and methods disclosed herein. In certain embodiments, the SPU 1314 may operate in a logically secure processing domain and be configured to protect and operate on secret information. In some embodiments, the SPU 1314 may include internal memory storing executable instructions or programs configured to enable the SPU 1314 to perform secure operations.

The operation of system 1300 may be generally controlled by the processor 1302 and/or 1314 operating by executing software instructions and programs stored in the system memory 1304 (and/or other computer-readable media, such as removable memory 1308). The system memory 1304 may store a variety of executable programs or modules for controlling the operation of the system 1300. For example, the system memory 1304 may include an OS 1320 for managing and coordinating in part system hardware resources and providing for common services for execution of various applications. The system memory 1304 may further include, without limitation: one or more applications 1324 (e.g., media applications or other device applications), a personal agent 1326 utilized in managing personal information relating to a user and/or advertisement and content targeting operations described herein; a personal ontology graph 100 representing a variety of user interests as described herein; an inference engine 216 configured to generate one or more inferred interests associated with available personal information as disclosed herein; and/or a matching engine 708 for performing certain advertisement and/or content targeting and/or matching operations as disclosed herein. The system memory 1304 may further include any other functional module configured to implement the systems and methods disclosed herein when executed by the processor 1302 and/or SPU 1314.

One of ordinary skill in the art will appreciate that the systems and methods described herein can be practiced with computing devices similar or identical to that illustrated in FIG. 13, or with virtually any other suitable computing device, including computing devices that do not possess some of the components shown in FIG. 13 and/or computing devices that possess other components that are not shown. Thus it should be appreciated that FIG. 13 is provided for purposes of illustration and not limitation.

The systems and methods disclosed herein are not inherently related to any particular computer, electronic control unit, or other apparatus and may be implemented by a suitable combination of hardware, software, and/or firmware. Software implementations may include one or more computer programs comprising executable code/instructions that, when executed by a processor, may cause a computer system to perform a method defined at least in part by the executable instructions. The computer program can be written in any form of programming language, including compiled or interpreted languages, and can be deployed in any form, including as a standalone program or as a module, component, subroutine, or other unit suitable for use in a computing environment. Further, a computer program can be deployed to be executed on one computer or on multiple computers at one site or distributed across multiple sites and interconnected by a communication network. Software embodiments may be implemented as a computer program product that comprises a non-transitory storage medium configured to store computer programs and instructions, that when executed by a processor, are configured to cause a computer system to perform a method according to the instructions. In certain embodiments, the non-transitory storage medium may take any form capable of storing processor-readable instructions on a non-transitory storage medium. A non-transitory storage medium may be embodied by a compact disk, digital-video disk, a magnetic tape, a magnetic disk, flash memory, integrated circuits, RAM, ROM, or any other non-transitory memory device.

Although the foregoing has been described in some detail for purposes of clarity, it will be apparent that certain changes and modifications may be made without departing from the principles thereof. It should be noted that there are many alternative ways of implementing both the systems and methods described herein. Accordingly, the present embodiments are to be considered as illustrative and not restrictive, and the invention is not to be limited to the details given herein, but may be modified within the scope and equivalents of the appended claims.

What is claimed is:

1. A method performed by a trusted system comprising a processor and a non-transitory computer-readable storage medium storing instructions that, when executed by the processor, cause the trusted system to perform the method, the method comprising:

receiving, at an interface of the trusted system, from a device, personal information relating to a user of the device, the personal information being provided by a plurality of trusted components included in a plurality of applications executing on the device;

generating, based on the personal information, a person ontology graph relating to the user, the personal ontology graph comprising first level interest information relating to the user derived from at least one or more inferences based on the personal information, wherein generating the personal ontology graph further comprises:

accessing an interest taxonomy database;

identifying one or more second level interests included in the interest taxonomy database associated with the first level interest information, and including the one or more second level interests in the personal ontology graph;

receiving, by the interface, a plurality of content items;

selecting, based at least in part on the first level interest information and the one or more second level interests included in the personal ontology graph, a content item of the plurality of content items; and transmitting, from the interface, the selected content item to the user device for rendering by the device.

2. The method of claim 1, wherein the personal information comprises information obtained by one or more sensors of the device.

3. The method of claim 2, wherein the personal information comprises location information obtained by one or more location sensors of the device.

4. The method of claim 1, wherein the personal information comprises an indication of one or more applications executing on the device.

5. The method of claim 4, wherein the indication of one or more applications comprises one or more process identifiers associated with the one or more applications.

6. The method of claim 1, wherein the personal information comprises activity information relating to activities performed by the user one the device.

7. The method of claim, 1, wherein the personal ontology graph comprises at least one attribute associating the user with an interest.

8. The method of claim 7, wherein the attribute comprises a score relating to a strength of an association between the user and the interest.

9. The method of claim 1, wherein the selected content item comprises an advertisement.

* * * * *